(12) United States Patent
Kim et al.

(10) Patent No.: US 12,297,578 B2
(45) Date of Patent: May 13, 2025

(54) ELECTRONIC APPARATUS AND CONTROL METHOD FOR IDENTIFYING A CARE COURSE AND CARE ORDER OF CLOTHING CARE DEVICES

(71) Applicant: Samsung Electronics Co., Ltd., Suwon-si (KR)

(72) Inventors: Jihyun Kim, Suwon-si (KR); Kyoungae Lim, Suwon-si (KR); Jikyoung Kim, Suwon-si (KR); Seungjoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 17/851,750

(22) Filed: Jun. 28, 2022

(65) Prior Publication Data

US 2022/0325460 A1    Oct. 13, 2022

Related U.S. Application Data

(63) Continuation of application No. PCT/KR2020/019496, filed on Dec. 31, 2020.

(30) Foreign Application Priority Data

Jan. 3, 2020    (KR) .......................... 10-2020-0000806

(51) Int. Cl.
*D06F 34/28* (2020.01)
*D06F 34/05* (2020.01)
(Continued)

(52) U.S. Cl.
CPC .............. *D06F 34/28* (2020.02); *D06F 34/05* (2020.02); *G05B 15/02* (2013.01);
(Continued)

(58) Field of Classification Search
CPC ...... D06F 34/05; D06F 34/28; D06F 2101/06; D06F 2101/14; D06F 2101/04; D06F 2105/60; G05B 15/02
See application file for complete search history.

(56) References Cited

U.S. PATENT DOCUMENTS 10,753,029 B2    8/2020  Shu et al.
2013/0185079 A1*  7/2013  Park .................... H04L 12/2818
                                                         340/3.7
(Continued)

FOREIGN PATENT DOCUMENTS

AU        2018257685 B2    11/2018
KR    10-2013-0070809 A     6/2013
(Continued)

OTHER PUBLICATIONS

Korean Office Action dated Aug. 20, 2024, issued in Korean Patent Application No. 10-2020-0000806.

*Primary Examiner* — Daniel Samwel
(74) *Attorney, Agent, or Firm* — Jefferson IP Law, LLP

(57) ABSTRACT

An electronic apparatus is provided. An electronic apparatus includes a memory in which an application is stored, a display, and a processor which executes the application so that, when context information about a user is received, the care course and the care order of each of a plurality of clothing care devices registered in the application are identified on the basis of the received context information about the user, and which controls the display so that a user interface (UI) including customized care information about the user is provided on the basis of the identified care course and care order of each of the plurality of clothing care devices.

20 Claims, 31 Drawing Sheets

(51) Int. Cl.
  *D06F 101/04*  (2020.01)
  *D06F 101/06*  (2020.01)
  *D06F 101/14*  (2020.01)
  *D06F 105/60*  (2020.01)
  *G05B 15/02*   (2006.01)

(52) U.S. Cl.
  CPC ...... *D06F 2101/04* (2020.02); *D06F 2101/06* (2020.02); *D06F 2101/14* (2020.02); *D06F 2105/60* (2020.02)

(56) References Cited

U.S. PATENT DOCUMENTS

| | | |
|---|---|---|
| 2018/0187954 A1 | 7/2018 | Yang et al. |
| 2018/0305851 A1* | 10/2018 | Kwon ................ H04L 12/2825 |
| 2019/0287153 A1* | 9/2019 | Shu .................... G06Q 30/0641 |
| 2020/0002872 A1 | 1/2020 | Kim |
| 2020/0004278 A1* | 1/2020 | Lee .................... G05D 23/1904 |
| 2020/0069145 A1* | 3/2020 | Helms ..................... D06F 33/37 |
| 2020/0096954 A1 | 3/2020 | Kim et al. |
| 2020/0190721 A1* | 6/2020 | Kim ........................ D06F 33/00 |
| 2020/0199800 A1* | 6/2020 | Han ......................... D06F 33/00 |
| 2021/0062385 A1 | 3/2021 | Kim et al. |
| 2021/0164149 A1* | 6/2021 | Giacomini .............. D06F 34/05 |
| 2022/0042231 A1 | 2/2022 | Jang et al. |

FOREIGN PATENT DOCUMENTS

| | | |
|---|---|---|
| KR | 10-2016-0041352 A | 4/2016 |
| KR | 10-2017-0122774 A | 11/2017 |
| KR | 10-2018-0080068 A | 7/2018 |
| KR | 10-2019-0024671 A | 3/2019 |
| KR | 10-2019-0084915 A | 7/2019 |
| KR | 10-2019-0090734 A | 8/2019 |
| KR | 10-2070783 B1 | 1/2020 |
| KR | 10-2020-0030472 A | 3/2020 |
| KR | 10-2021-0095140 A | 7/2021 |

* cited by examiner

ELECTRONIC APPARATUS AND CONTROL METHOD FOR IDENTIFYING A CARE COURSE AND CARE ORDER OF CLOTHING CARE DEVICES

CROSS-REFERENCE TO RELATED APPLICATION(S)

This application is a continuation application, claiming priority under § 365(c), of an International application No. PCT/KR2020/019496, filed on Dec. 31, 2020, which is based on and claims the benefit of a Korean patent application number 10-2020-0000806, filed on Jan. 3, 2020, in the Korean Intellectual Property Office, the disclosure of each of which is incorporated by reference herein in its entirety.

BACKGROUND

1. Field

The disclosure relates to an electronic apparatus and a method for controlling thereof. More particularly, the disclosure relates to an electronic apparatus for controlling an external device by executing an application and a method for controlling thereof.

2. Description of Related Art

With the development of electronic technology, various types of electronic apparatuses have been developed and distributed. Particularly, home appliances used at home have been continuously developed in recent years to satisfy needs of users.

Various methods for controlling home appliances in a home through an application installed on a smart phone have been recently distributed. However, there is a problem that a method of controlling an apparatus providing a clothing care function, such as a washing machine, a dryer, and an air dresser, in an integrated manner has not been widely distributed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus that provides a user interface (UI) for guiding a method for integrally controlling a plurality of clothing care devices based on a user's context, and a method for controlling thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a memory configured to store an application, a display, and a processor configured to, by executing the application, based on user's context information being received, identify a care course and a care order of each of a plurality of clothing care devices registered in the application based on the received user's context information, and control the display to provide a UI including user's customized care information based on the care course and care order of each of the identified plurality of clothing care devices.

The user's context information may include at least one of lifestyle information, care available time information, clothing attribute information, and clothing quantity information of the user, and wherein the plurality of clothing care devices are configured to include at least two of a washing machine, a dryer, or a clothing purifier.

The processor may identify at least two clothing care devices among the plurality of clothing care devices based on the context information of the user, and identify care course information of each of the selected clothing care devices.

The processor may identify a care order of the plurality of clothing care devices based on first context information of the user and type information of the plurality of clothing care devices, and identify a care course of a first clothing care device among the plurality of clothing care devices based on second context information of the user, and identify a care course of a second clothing care device among the plurality of clothing care devices based on the user context information and the care course information of the first clothing care device, wherein the care of the first clothing care device is configured to be performed before the care of the second clothing care device.

The processor may identify a care course of the plurality of clothing care devices based on third context information of the user and type information of the plurality of clothing care devices, and identify a care order of the plurality of clothing devices based on fourth context information of the user.

The user's customized care information may include information on care course information, care time information, and care progress information of each of the plurality of clothing care devices, wherein the care progress information is configured to include status information of a currently operating care device and information on a care device currently on standby.

The apparatus may further include a speaker, wherein the processor is configured to control at least one of the display and the speaker to provide notification information when the user's intervention is required while care is in progress according to the user's customized care information.

The processor may control the display to display a UI including remaining status information of an accessory with respect to each of the plurality of clothing care devices and purchase-related information including link information of a purchase site.

The processor may, based on some of the plurality of care information included in the customized care information being modified by a user input, reflect the modified information and provide customized care information thereafter.

The user's context information may be received by a user input on an execution screen of the application or received from another application.

In accordance with another aspect of the disclosure, a method of controlling a user terminal for controlling a plurality of clothing care devices by executing an application is provided. The method includes, based on user's context information being received, identifying a care course and a care order of each of a plurality of clothing care devices registered in the application based on the received user's context information, and providing a UI including user's customized care information based on the care course and care order of each of the identified plurality of clothing care devices.

The user's context information may include at least one of lifestyle information, care available time information, clothing attribute information, and clothing quantity information of the user, and wherein the plurality of clothing care devices are configured to include at least two of a washing machine, a dryer, or a clothing purifier.

The identifying the care course and the care order of each of the plurality of clothing care devices may include identifying at least two clothing care devices among the plurality of clothing care devices based on the context information of the user, and identifying care course information of each of the selected clothing care devices.

The identifying the care course and the care order of each of the plurality of clothing care devices may include identifying a care order of the plurality of clothing care devices based on first context information of the user and type information of the plurality of clothing care devices, identifying a care course of a first clothing care device among the plurality of clothing care devices based on second context information of the user, and identifying a care course of a second clothing care device among the plurality of clothing care devices based on the user context information and the care course information of the first clothing care device, wherein the care of the first clothing care device is configured to be performed before the care of the second clothing care device.

The identifying the care course and the care order of each of the plurality of clothing care devices may include identifying a care course of the plurality of clothing care devices based on third context information of the user and type information of the plurality of clothing care devices, and identifying a care order of the plurality of clothing devices based on fourth context information of the user.

The user's customized care information may include information on care course information, care time information, and care progress information of each of the plurality of clothing care devices, wherein the care progress information is configured to include status information of a currently operating care device and information on a care device currently on standby.

The providing notification information as at least one of graphic user interface (GUI) or sound may be further included when the user's intervention is required while care is in progress according to the user's customized care information.

The displaying a UI including remaining status information of an accessory with respect to each of the plurality of clothing care devices and purchase-related information including link information of a purchase site may be further included.

Based on some of the plurality of care information included in the customized care information being modified by a user input, reflecting the modified information and providing customized care information thereafter may be further included.

The user's context information may be received by a user input on an execution screen of the application on received from another application.

According to various embodiments described above, a complex clothing care method tailored for the user's interests is integrally guided, thereby improving the user's convenience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
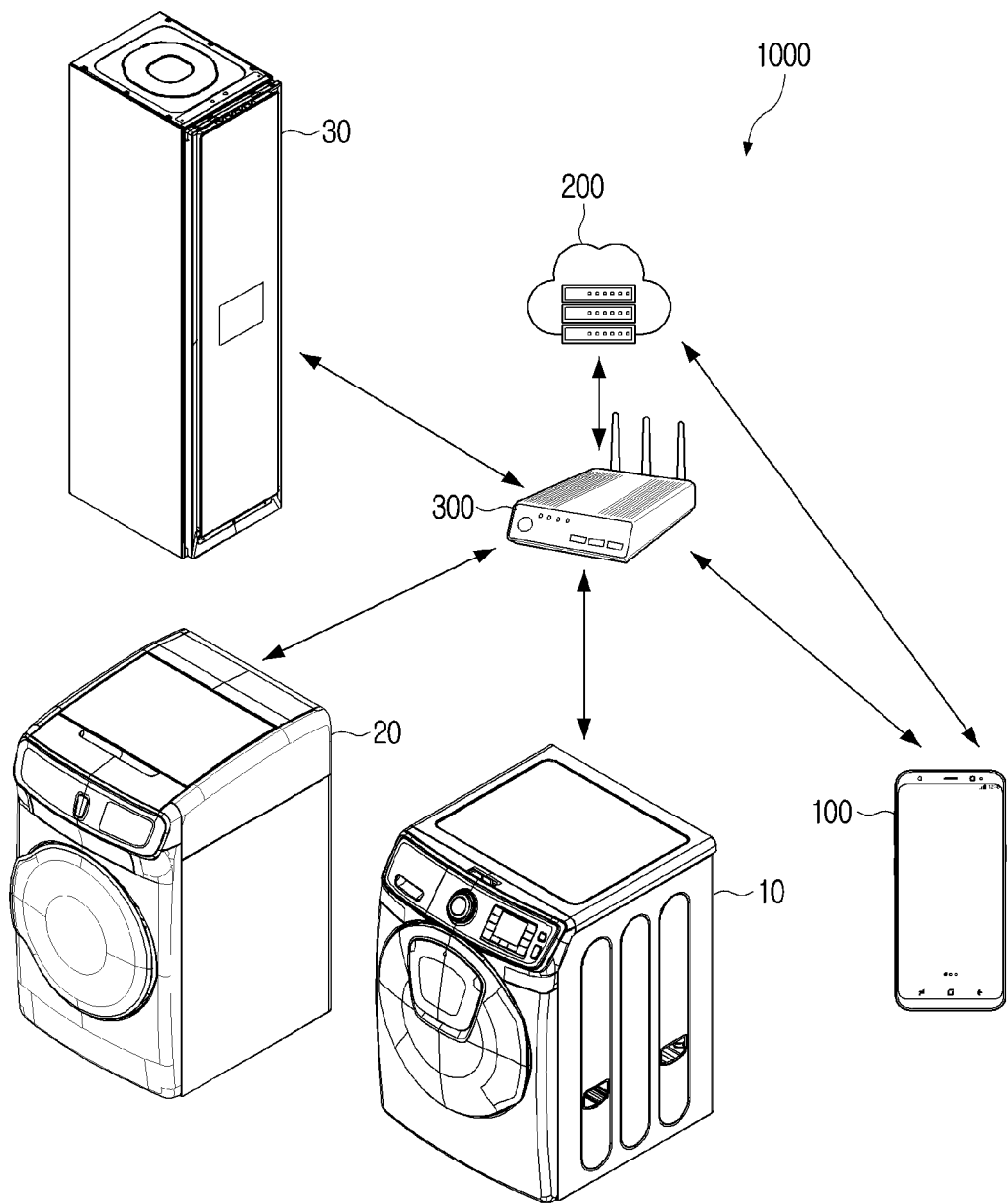
FIG. 1 is a view illustrating an electronic system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but may be different depending on intention of those skilled in the art, a precedent, appearance of new technologies, and the like. Further, in specific cases, terms may be arbitrarily selected. In that configuration, the meaning of the terms will be described in the description of the corresponding embodiments. Accordingly, the terms used in the description should not necessarily be construed as simple names of the terms, but be defined based on meanings of the terms and overall contents of the disclosure.

The terms "have", "may have", "include", and "may include" used in the embodiments of the disclosure indicate the presence of corresponding features (for example, elements such as numerical values, functions, operations, or parts), and do not preclude the presence of additional features.

The term "at least one of A or/and B" means including at least one A, including at least one B, or including both at least one A and at least one B.

The term such as "first" and "second" used in various embodiments may modify various elements regardless of an order and/or importance of the corresponding elements, and does not limit the corresponding elements.

When an element (e.g., a first element) is "operatively or communicatively coupled with/to" or "connected to" another element (e.g., a second element), an element may be directly coupled with another element or may be coupled through the other element (e.g., a third element).

The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

Hereinafter, various embodiments of the disclosure will be described in more detail with reference to the accompanying drawings.

FIG. 1 is a view illustrating an electronic system according to an embodiment of the disclosure.

Referring to FIG. 1, a system 1000 may include an electronic apparatus 100, a server 200, and a plurality of control target devices 10, 20, and 30.

The control target devices 10, 20, and 30 may be various Internet of Things (IoT) devices that can be controlled through an application installed in the electronic apparatus 100. According to an embodiment, it may be implemented as a device that performs various functions related to washing, such as a washing machine that washes laundry using water and detergent and dehydrates wet laundry, a dryer that performs drying of clothes, a clothing purifier, and the like. However, hereinafter, for convenience of description, a device that performs various functions related to clothes or laundry is referred to as a "clothing care device".

The server 200 may control and manage various devices (e.g., home appliances, Internet of Things (IoT) devices, etc.) registered in the server 200. In that configuration, the server 200 may register devices for each user account. The server 200 may be implemented as a cloud server, but is not limited thereto.

The electronic apparatus 100 may download and install an application from a server (not shown) that provides an application. In that configuration, the user may log in to the server 200 through an input user account by executing the application on the electronic apparatus 100 and inputting a user account, and the electronic apparatus 100 may communication with the server 200 based on the logged-in user account.

The electronic apparatus 100 may communicate with a clothing care device operating in an access point (AP) mode, and transmit information on an access point 300 (i.e., wireless fidelity (Wi-Fi) access point) to the clothing care devices 10, 20, and 30. For example, the electronic apparatus 100 may display a list of connectable access points on the display of the electronic apparatus 100, and transmit information on the access points 300 selected from the list according to a user command to the clothing care device 10, 20, and 30.

Meanwhile, the clothing care devices 10, 20, and 30 may perform communication connection with the access point 300 using the information on the access point 300 received from the electronic apparatus 100, and access to the server 200 through the access point 300. Accordingly, when the clothing care device is accessed through the access point 300, the server 200 may register the clothing care device in a logged-in user account.

Meanwhile, when the clothing care device is registered in the user account, the server 200 may transmit the data received from the clothing care device to the electronic apparatus 100 that performs communication with the server 200 based on the user account in which the clothing care devices 10, 20, and 30 are registered. In addition, when a control command for the clothing care devices 10, 20, and 30 is received from the electronic apparatus 100, the server 200 may transmit the received control command to the clothing care device. In that configuration, the electronic apparatus 100 implemented as a smartphone, tablet, or the like may transmit the control command for the clothing care devices 10, 20 and 30 to the server 200 through the application installed in the electronic apparatus 100 by accessing to the server 200 through the access point 300 or accessing the server 200 through a mobile communication network such as LTE, 5G, or the like.

Hereinafter, various UI screens provided through an application installed in the electronic apparatus 100 according to various embodiments of the disclosure will be described.

Figure 2:
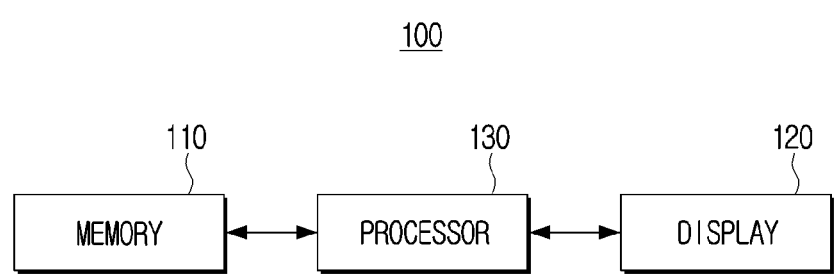
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

Referring to FIG. 2, the electronic apparatus 100 includes a memory 110, a display 120, and a processor 130.

The electronic apparatus 100 may be implemented as a user terminal. For example, the electronic apparatus 100 includes a smart phone, a tablet personal computer (PC), a smart television (TV), a mobile phone, a personal digital assistant (PDA), a laptop, a media player, an e-book terminal, a digital broadcasting terminal, a navigation system, a moving picture experts group layer-3 audio (MP3) player, a digital camera, and a home appliance. devices and other mobile or non-mobile computing devices. In addition, the electronic apparatus 100 may be a wearable terminal such as a watch, glasses, a hair band, and a ring having a communication function, a data processing function, or the like. The electronic apparatus 140 is not limited to the above description. In addition, the electronic apparatus 100 is equipped with a touch screen and may be implemented to execute a program using a finger or a pen (e.g., a stylus pen).

The memory 110 may store data required for various embodiments of the disclosure. The memory 110 may be implemented in the form of a memory embedded in the electronic apparatus 100' or may be implemented in the form of a memory detachable to the electronic apparatus 100' depending on a purpose of data storage. For example, data for driving the electronic apparatus 100 may be stored in a memory embedded in the electronic apparatus 100, and data for an extended function of the electronic apparatus 100 may be stored in a memory attached to and detached from the electronic apparatus 100. Meanwhile, the memory embedded in the electronic apparatus 100' may be implemented as at least one of a volatile memory (e.g., random access memory (RAM) (DRAM), static RAM (SRAM), or synchronous dynamic RAM (SDRAM)), non-volatile memory (e.g., one time programmable read only memory (ROM) (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive, or a solid state drive (SSD). Also, the memory detachable from the electronic apparatus 100 may be implemented as a memory card (e.g., compact flash (CF), secure digital (SD), micro secure digital (Micro-SD), mini secure digital (Mini-SD), extreme digital (xD), multi-media card (MMC), etc.), external memory that can be connected to the universal serial bus (USB) port (e.g., USB memory), and the like.

According to an embodiment, the memory 110 may store various data, programs, or applications for driving/controlling the electronic apparatus 100. The memory 110 may store a control program for controlling the electronic apparatus 100 and the processor 130, an application initially provided by a manufacturer or downloaded from the outside, databases, or related data. For example, the memory 110 may store an application for controlling an external device (e.g., the application described in FIG. 1) according to an embodiment. The application may be an application for remotely controlling home appliances or the like in a home.

The display 120 may be implemented as a display including a self-luminous element or a display including a non-light-emitting device and a backlight. For example, it may be implemented in various types of displays such as liquid crystal display (LCD), organic light emitting diodes (OLED) displays, light emitting diodes (LED), micro LED, Mini LED, plasma display panel (PDP), quantum dot (QD) displays, quantum dot light-emitting diodes (QLEDs), and the like. In the display 120, a driving circuit, a backlight unit, or the like, which may be implemented in the form of an a-si TFT, a low temperature poly silicon (LTPS) TFT, an organic TFT (OTFT), or the like may also be included. Meanwhile, the display 120 may be implemented as a touch screen combined with a touch sensor, a flexible display, a rollable display, a three-dimensional (3D) display, a display in which a plurality of display modules are physically connected, and the like.

The processor 130 may be electrically connected to the memory 110 and control the overall operation of the electronic apparatus 100. The processor 130 may be composed of one or more processors. Specifically, the processor 130 may perform an operation of the electronic apparatus 100 according to various embodiments of the disclosure by executing at least one instruction stored in a memory 110.

According to an embodiment, the processor 130 may be implemented as a digital signal processor (DSP), a microprocessor, a graphics processing unit (GPU), an artificial intelligence (AI), a neural processing unit (NPU), a timing controller (T-CON) that processes a digital image signal. However, it is not limited thereto, and may include one or more of a central processing unit (CPU), microcontroller unit (MCU), micro processing unit (MPU), controller, application processor, or communication processor (CP), advanced reduced instruction set computer (RISC) machine (ARM) processor, or may be defined with a corresponding term. In addition, the processor 130 may be implemented as a system on chip (SoC), large-scale integration (LSI), with a built-in processing algorithm, or may be implemented in the form of application specific integrated circuit (ASIC) and field programmable gate array (FPGA).

The processor 130 may control the display 120 to display the UI screen. The UI screen may include a screen for playing various contents such as images, videos, texts, and music, an application execution screen including various contents, a web browser screen, a graphic user interface (GUI) screen, and the like.

According to an embodiment, the processor 130 may provide a UI screen related to an external device. In that configuration, the UI screen may be provided through an application, which is software directly used by the user on the OS. In that configuration, the application may be provided in a form of an icon interface on the screen of the display 120.

According to an example, the external device may be implemented as a home appliance such as a clothing care device (10, 20, 30 in FIG. 1) provided in a home. However, hereinafter, it is assumed that the external device is implemented as the clothing care devices 10, 20, and 30 for convenience of description. According to an example, the UI screen provided through the application may provide various information related to an operation of the clothing care devices 10, 20, and 30, and function as a control panel capable of inputting and outputting for controlling the clothing care devices 10, 20, and 30. In other words, the UI screen is a configuration for a user and an interface, and may include an input interface for receiving a user's input and an output interface for displaying information (e.g., control information) according to the user's input.

According to an embodiment, when the user's context information is received, the processor 130 may identify a care course and a care order of each of the plurality of clothing care devices registered in the application based on the received user's context information. The processor 130 may control the display 120 to provide a UI including the user's customized care information based on the care course and care order of each of the identified plurality of clothing care devices.

The user's context information may include at least one of the user's lifestyle information, care available time information, clothing attribute information, and clothing quantity information. The user's context information may be received by a user input on an execution screen of the application, or may be received from the other application or other home appliance. The other application may be a calendar application, a clock application, and the like. According to an example, the user's schedule information received from the calendar application may be used as care available time information among the user's context information.

In addition, the plurality of clothing care devices may include at least two or more of a washing machine, a dryer, and an air dresser. For example, the processor 130 may identify at least two clothing care devices required for user customized care from among the plurality of clothing care devices registered in the application based on the user's context information. For example, the processor 130 may identify at least two clothing care devices, a care course and care order of the corresponding clothing care devices by integrally considering a course duration of each clothing care device, a relativity between courses to be performed on each clothing care device, synergy effects, and the like.

Meanwhile, the user's customized care information may include at least one of care course information, care time information, and care progress of each of the plurality of clothing care devices. For example, the user's customized care information may include all of the care course information, care time information, and care progress of each of the plurality of clothing care devices. In that configuration, the information on the care progress may include at least one of status information of a currently operating care device, information on a currently waiting care device, and information on the remaining care time.

According to an example, the processor 130 is configured to identify a care order of the plurality of clothing care devices based on the user's first context information and the type information of the plurality of clothing care devices, identify a care course of a first clothing care device among the plurality of clothing care devices based on the user's second context information, and identify a care course of a second clothing care device among the plurality of clothing care devices based on the user context information and the care course information of the first clothing care device. The care of the first clothing care device may be performed before the care of the second clothing care device.

The type information of the clothing care device may include information according to a function of the clothing care device, for example, a washing machine, a dryer, and a clothing purifier. Also, the care course may include a care course set for each device. For example, in the case of the washing machine, a care course may include a standard course, a wool laundry course, a baby laundry course, a soft bubble, and the like. In the case of the dryer, a care course may include removing dust, a sterilization course, a strong course, and the like. In the case of the clothing purifier, the care course may include a standard course, a fine dust course, a rapid course, a sterilization course, and the like.

However, the disclosure is not limited thereto, and the processor 130 may receive information on the care course updated from the outside. For example, the updated care course of the washing machine may include a course that manages the existing standard course more gentle. The updated care course of the dryer may include a course in which a sterilization function is added to an existing strong course. The care course of the clothing purifier may include a course in which a fine dust treatment function is added to a standard course. The updated care course may be provided by a manufacturer. In other words, the processor 130 may receive a care course more suitable for the user from the outside based on the user's usage pattern and the like, and recommend the received care course to the user.

Alternatively, the processor 130 may provide a function for fine-adjusting the care course to the user. For example, when the user selects removing dust during the care course of the dryer, the processor 130 may provide the user with a function to adjust a sterilization function in stages.

According to another embodiment, the processor 130 may identify a care course of the plurality of clothing care devices based on the user's third context information and the type information of the plurality of clothing care devices, and identify the care order of the plurality of clothing care devices based on the user's fourth context information.

However, in the embodiment described above, it has been described that the care type and care order are sequentially identified based on different contexts of users, but this is only an example, and the care type, care order, etc. may be identified sequentially by simultaneously considering context information of different users. The care type, order, or the like may be sequentially identified based on the context information of one user. The care type and the care type may be simultaneously identified by considering the context information of different users at the same time. Alternatively, the care type and the care type may be simultaneously identified based on the context information of one user.

According to an embodiment, the processor 130 may control at least one of the display 120 and the speaker (not shown) to provide notification information when the user's intervention is required during care according to the user's customized care information. For example, when a drying operation of the dryer proceeds after a washing operation of the washing machine is finished according to the customized care, the processor 130 may provide a notification related to the drying operation before a critical time for the end of the washing operation. In that configuration, for a corresponding notification, the processor 130 may receive information related to a washing progress from the server 200 or the washing machine.

According to an embodiment, the processor 130 may display a UI including remaining status information of an accessory related to each of the plurality of clothing care devices. In that configuration, the processor 130 may control the display 120 to display a UI including purchase-related information including link information of a purchase site whether to purchase an accessory whose remaining status is less than or equal to a critical value based on the remaining status information of the accessory.

According to an embodiment, when some information among a plurality of care information included in the customized care information is modified by a user input, the processor 130 may reflect the modified information to provide customized care information thereafter. For example, when the user's customized care information is stored, the processor 130 may update the stored customized care information by reflecting the modified information.

According to an embodiment, the processor 130 may acquire location information of the electronic apparatus 100 sensed by a location sensor (not shown). Since the electronic apparatus 100 is a terminal possessed by the user, location information of the electronic apparatus 100 may correspond to location information of the user. In that configuration, the acquired location information may be utilized as context information of the user. In other words, the processor 130 may identify a care course and a care order of each of the plurality of clothing care devices identified based on the user's location information. For example, the processor 130 may predict a time when the user arrives at a place where the clothing care device is located, for example, a home, based on the user's location information. For example, the processor 130 may predict how long it takes the user to get home from the user's current location based on various information such as a movement history (e.g., a time to usually get home from work), the means of transportation, a walking speed of the user. The processor 130 may identify a care course and a care order of each of the plurality of clothing care devices based on information related to the user's predicted arrival time and an operation time of the clothing care device.

Hereinafter, various embodiments of the disclosure will be described in more detail with reference to various UI screens provided to the electronic apparatus 100.

Figure 3A:
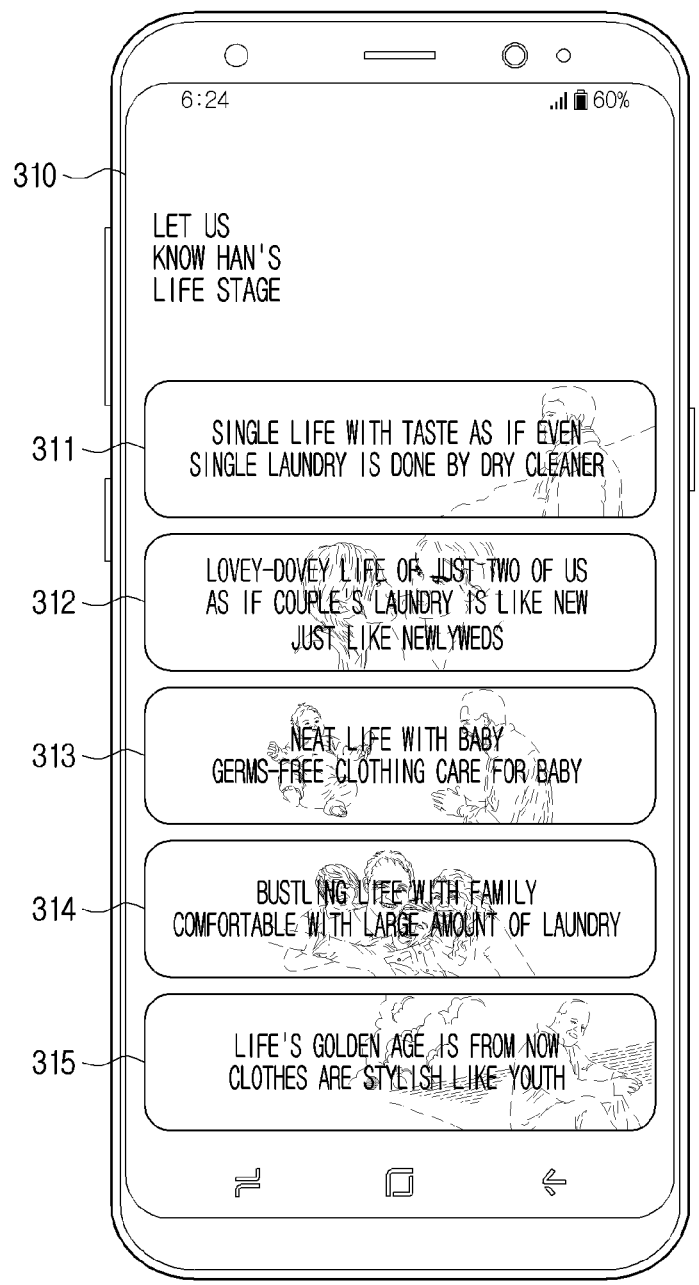
FIGS. 3A, 3B, and 4 are views illustrating a UI screen for setting a user context according to various embodiments of the disclosure.
Figure 3B:
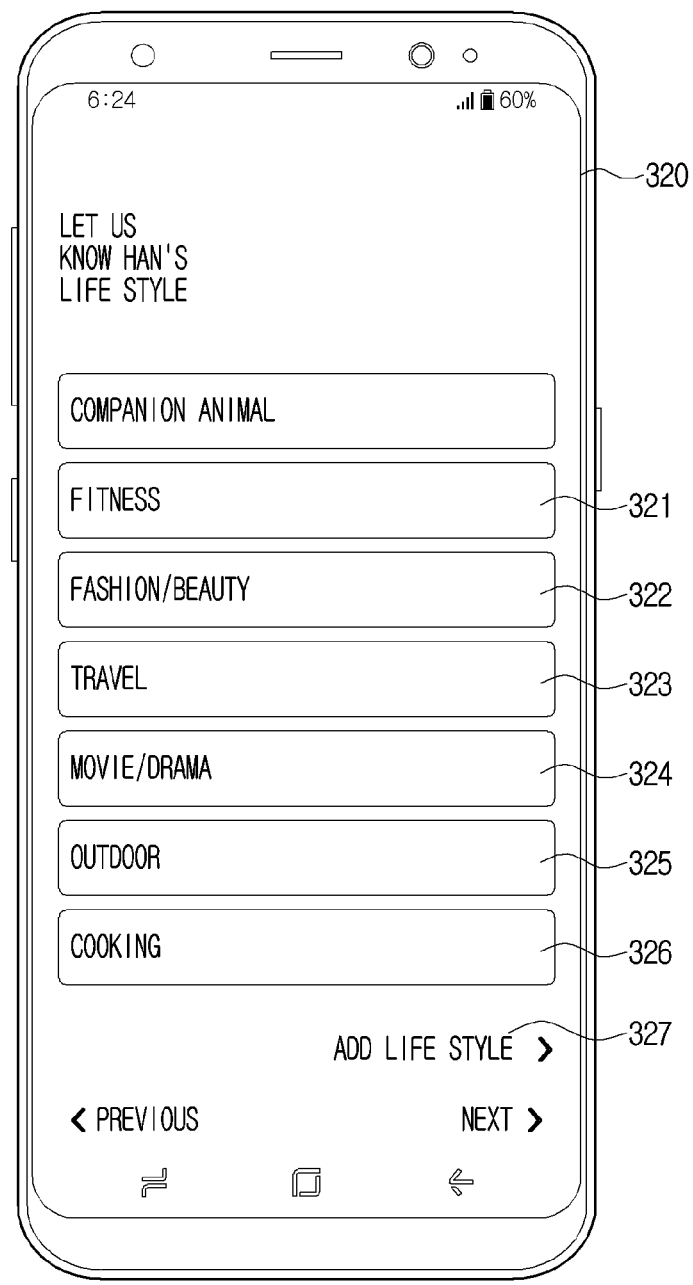
Figure 4:
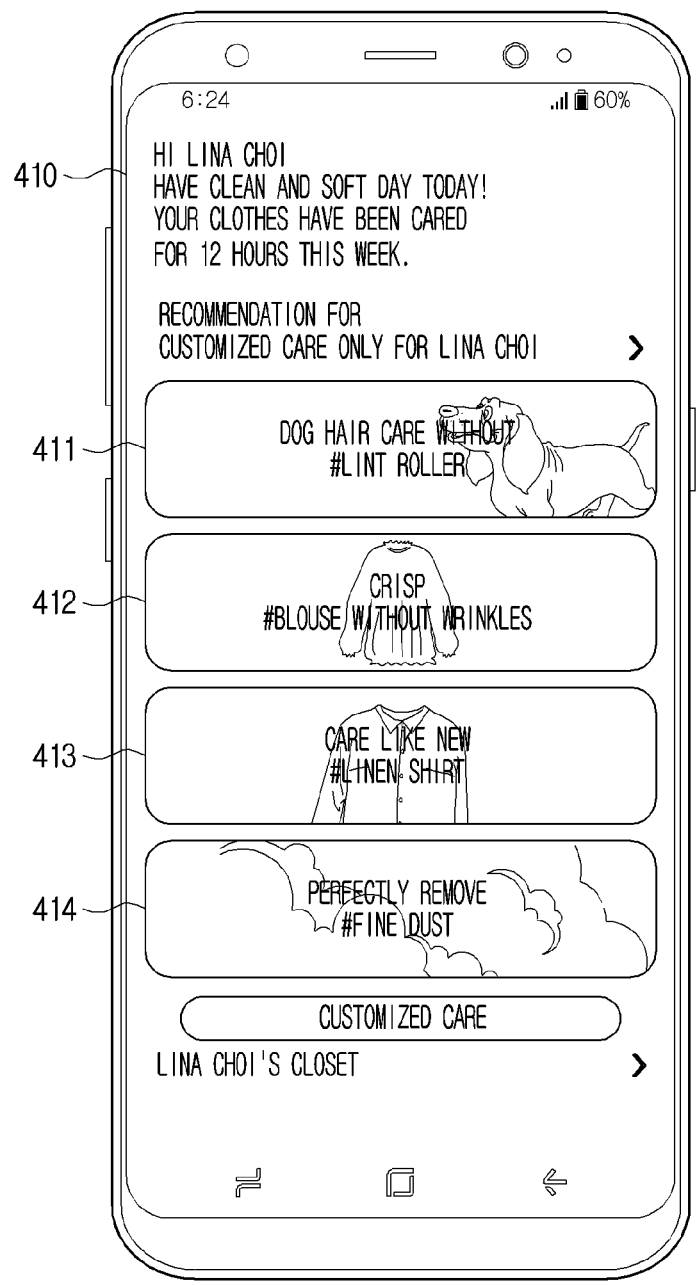

FIGS. 3A, 3B, and 4 are views illustrating a UI screen for setting a user context according to various embodiments of the disclosure.

Referring to FIGS. 3A and 3B, the processor 130 may provide a UI 310 including a plurality of life stage items. For example, when a specific menu item is selected on an application execution screen, the processor 130 may provide a UI including a plurality of life stage items. The corresponding menu item may be provided on an initial screen when the application is installed, but is not limited thereto. For example, it may be implemented such that a life stage can be changed in a setting item or the like.

According to an embodiment, when logging into a user account using an application, a UI screen 310 for receiving a user's life stage selection may be provided. The UI screen may include a plurality of life stage items 311 to 315 corresponding to various lifestyles. In that configuration, the plurality of life stage items 311 to 315 may be selectable based on a user touch input, but is not limited thereto.

According to another embodiment, the processor 130 may provide a UI 320 including a plurality of lifestyle items. The UI screen may include a plurality of lifestyle items 321 to 326 corresponding to various lifestyles. In that configuration, the plurality of lifestyle items 321 to 326 may be selectable based on a user touch input, but is not limited thereto. In addition, it may be possible for the user to directly add a lifestyle through an "Add lifestyle (327) item".

The UI screens may be provided separately, but may also be provided sequentially. For example, when one life stage item is selected in FIG. 3A, a UI screen for setting a lifestyle as shown in FIG. 3B may be provided.

Referring to FIG. 4, according to another embodiment, the processor 130 may provide a UI 410 including a plurality of customized care items. The UI screen may include a plurality of customized care items 411 to 414.

As described above, a UI screen for receiving a user's interest selection may be provided in various forms, and an item selected on the UI screen may be utilized as a user context according to an embodiment.

Figure 5A:
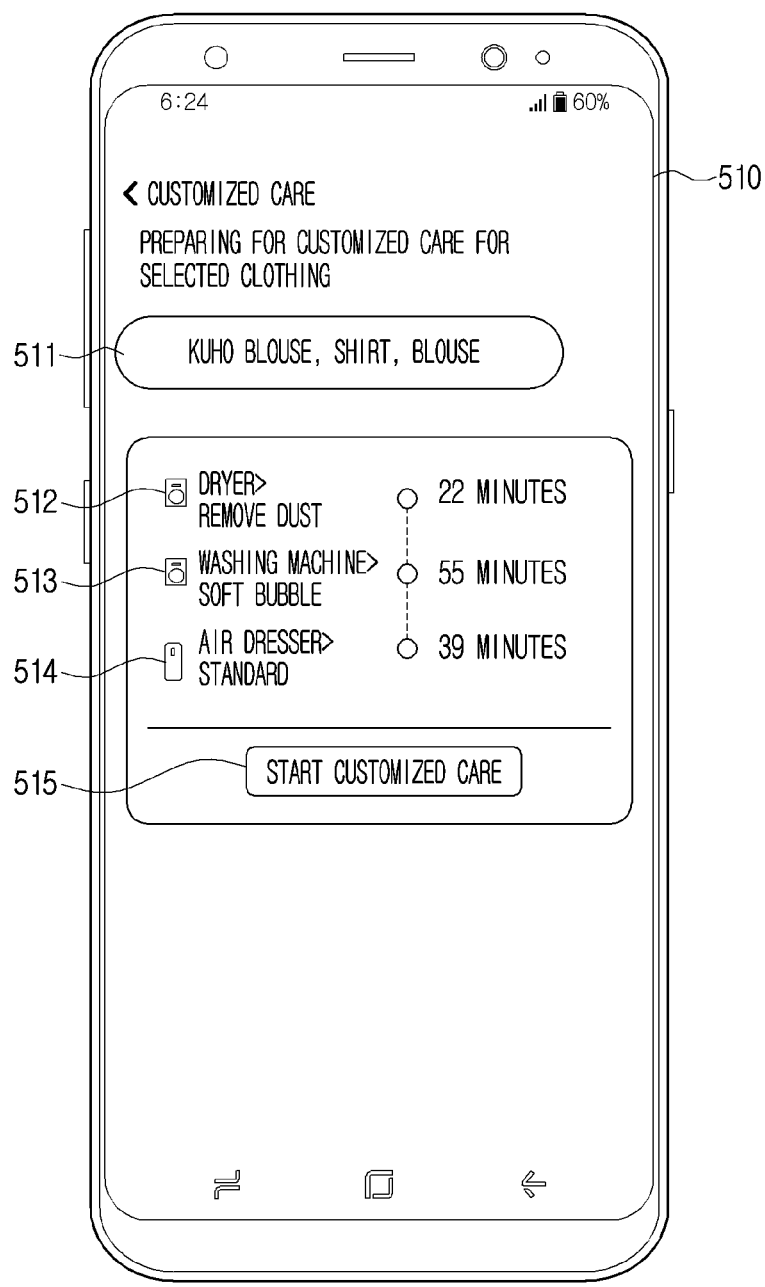
FIGS. 5A, 5B, and 5C are views illustrating a UI screen for providing customized care information according to various embodiments of the disclosure.
Figure 5B:
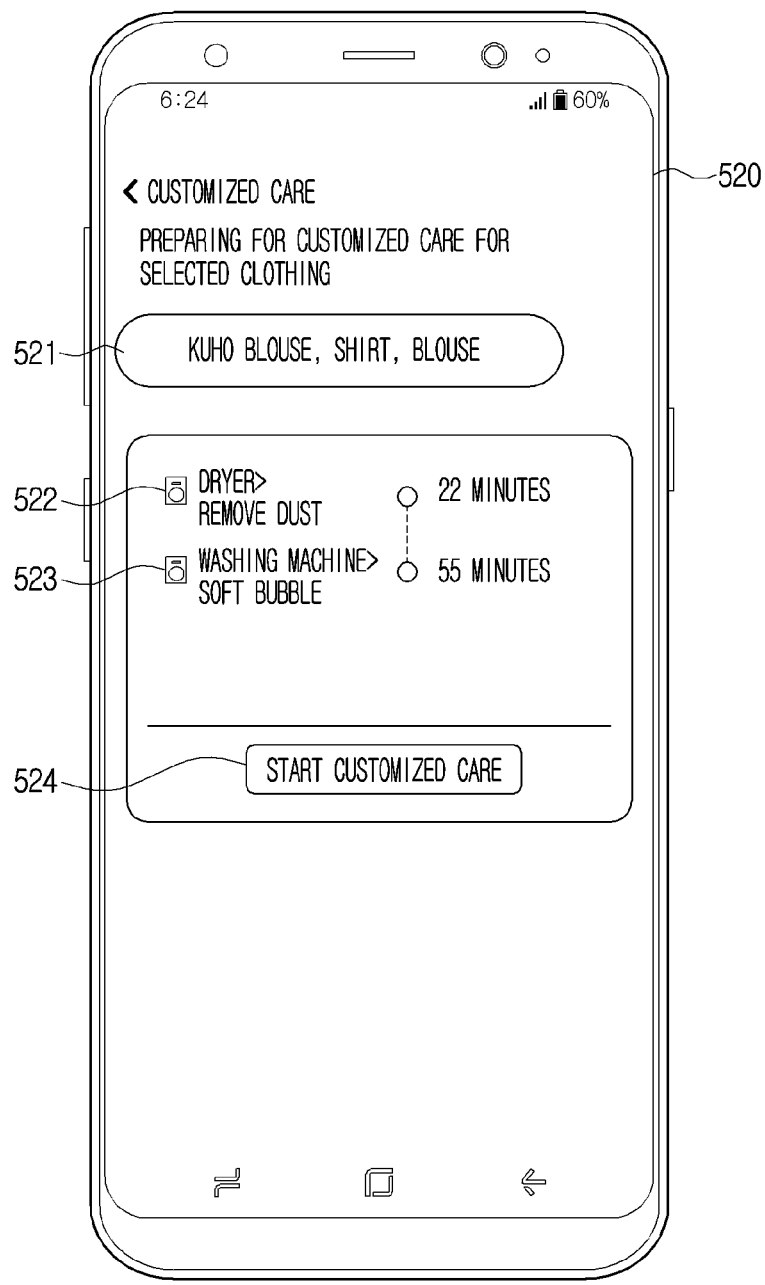
Figure 5C:
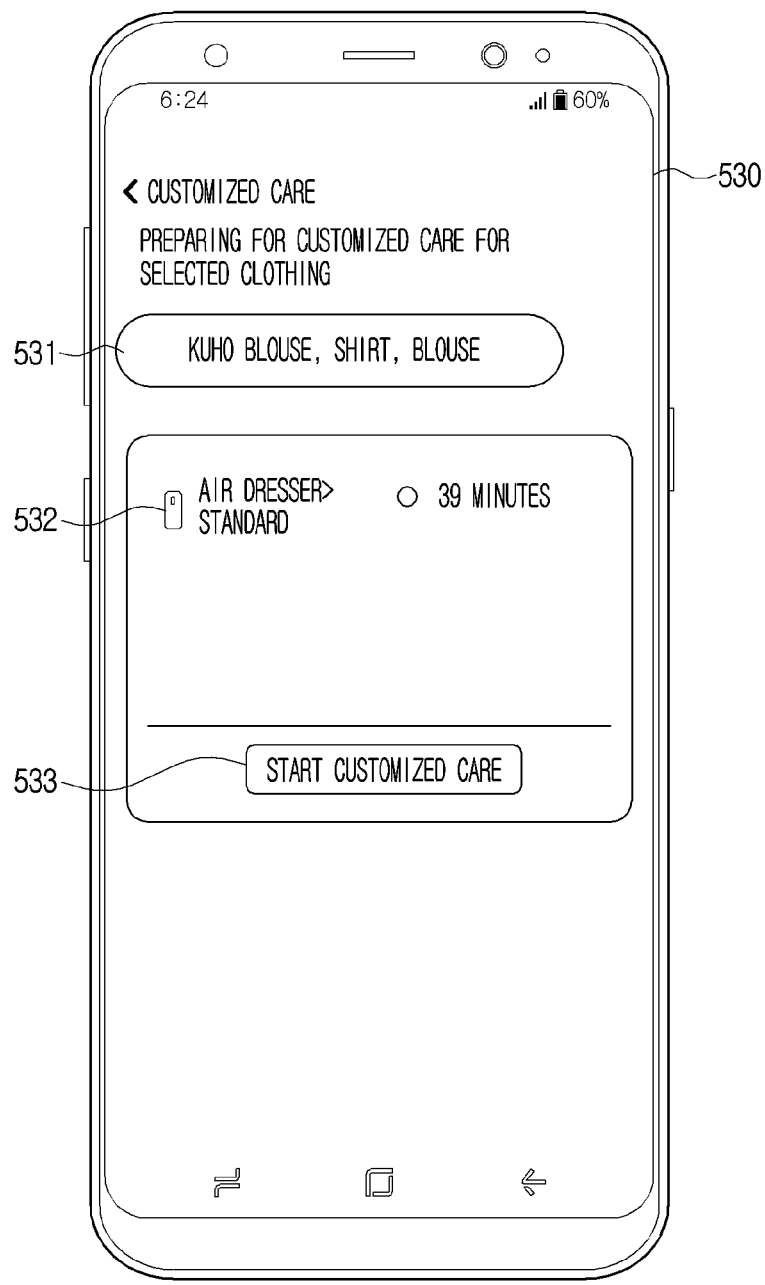

FIGS. 5A, 5B, and 5C are views illustrating a UI screen for providing customized care information according to various embodiments of the disclosure.

According to an embodiment, it is assumed that the clothes information selected by the user is used as the user context information.

In that configuration, the processor 130 may provide a UI screen including user customized care information in a form of FIGS. 5A to 5C based on the clothes information selected by the user. The processor 130 may generate customized care information for the user based on a washing method, material, etc. of the clothes selected by the user, and may provide the generated customized care information through the UI screen. In that configuration, information such as washing method and material of clothes may be pre-stored or received from the outside.

Referring to FIG. 5A, when a dryer, a washing machine, and an air dresser are determined as customized care devices based on the clothes information, a UI screen 510 may include clothes information 511 selected by the user, course information and operation time information 512, 513, and 514 on each of the plurality of clothing care devices, a customized care start button 515 and care order.

Referring to FIG. 5B, when a dryer and a washing machine are determined as customized care devices based on the clothes information, a UI screen 520 may include clothes information 521 selected by the user, course information and operation time information 522 and 523 on each of the plurality of clothing care devices, a customized care start button 524 and care order.

Referring to FIG. 5C, when the air dresser is determined as the customized care device based on the clothes information, a UI screen 530 may include clothes information 531 selected by the user, course information and the operation time information 532 of the air dresser, a customized care start button 533 and care order.

Figure 6:
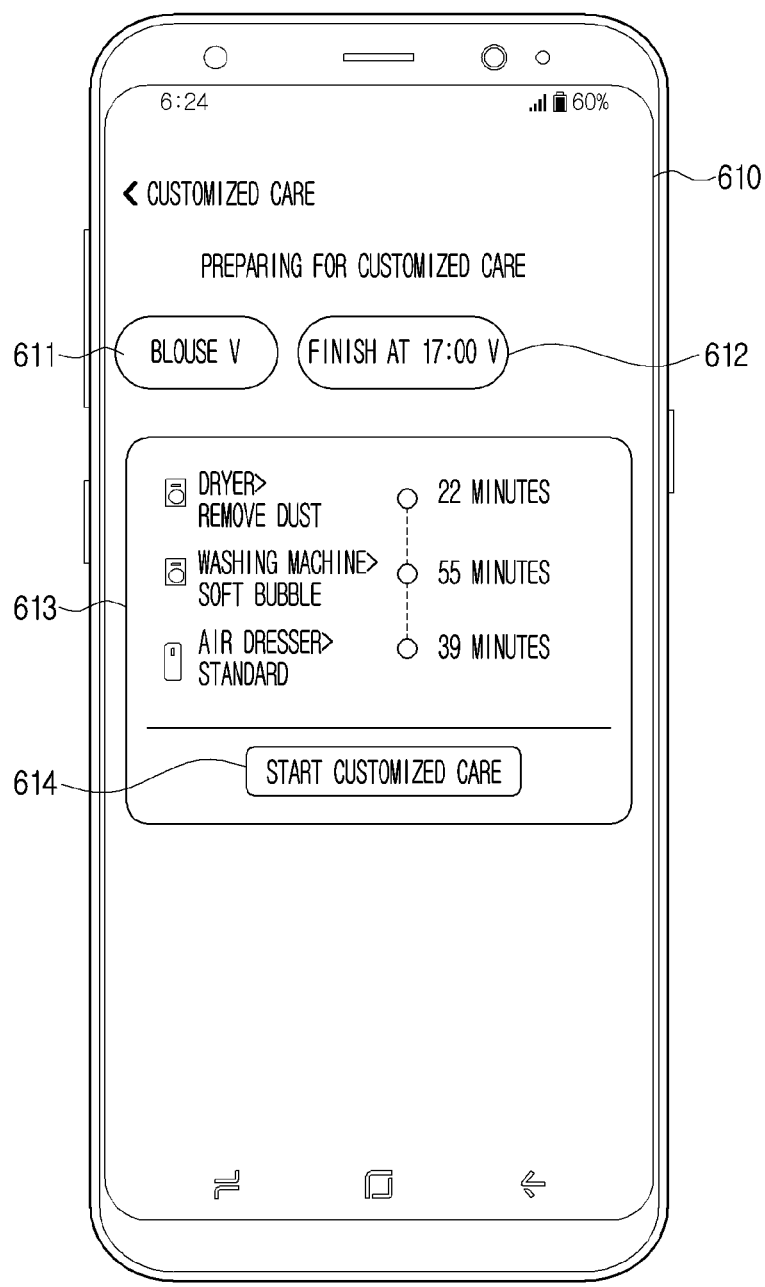
FIG. 6 is a view illustrating a UI screen for providing customized care information according to an embodiment of the disclosure.

FIG. 6 is a view illustrating a UI screen for providing customized care information according to an embodiment of the disclosure.

According to an embodiment, it is assumed that clothes information and end time information selected by the user are used as user context information.

In that configuration, the processor 130 may provide a UI screen including the user customized care information in the form of FIG. 6 based on the clothes information and end time information selected by the user. The processor 130 may generate customized care information for the user based on information on a washing method, material, etc. and end time of the clothes selected by the user, and may provide the generated customized care information through the UI screen.

Referring to FIG. 6, when a dryer, a washing machine, and an air dresser are determined as customized care devices based on the clothes information, a UI screen 610 may include clothes information 611 selected by the user, end time information 612, course information and operation time information 613 on each of the plurality of clothing care devices, a customized care start button 614 and care order.

Figure 7A:
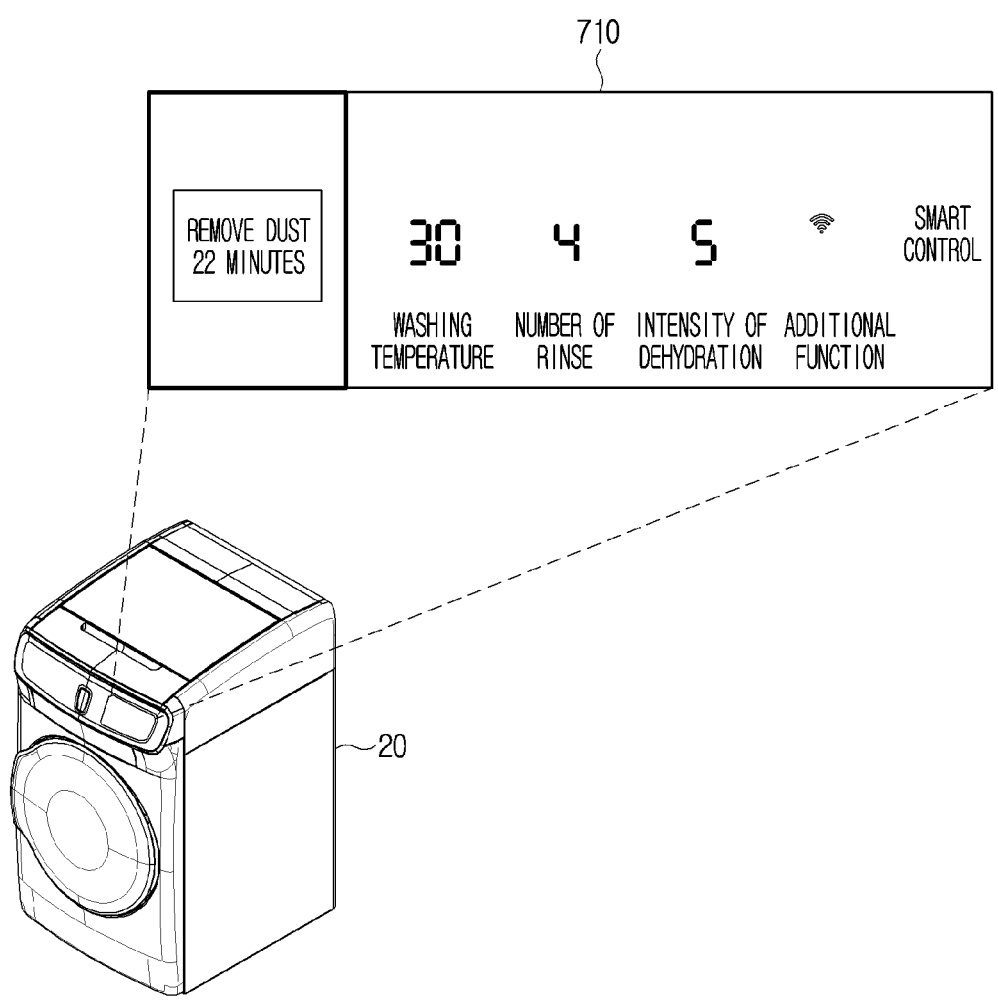
FIGS. 7A, 7B, and 7C are views illustrating a method of controlling each of clothing devices according to personalized care, according to various embodiments of the disclosure.
Figure 7B:
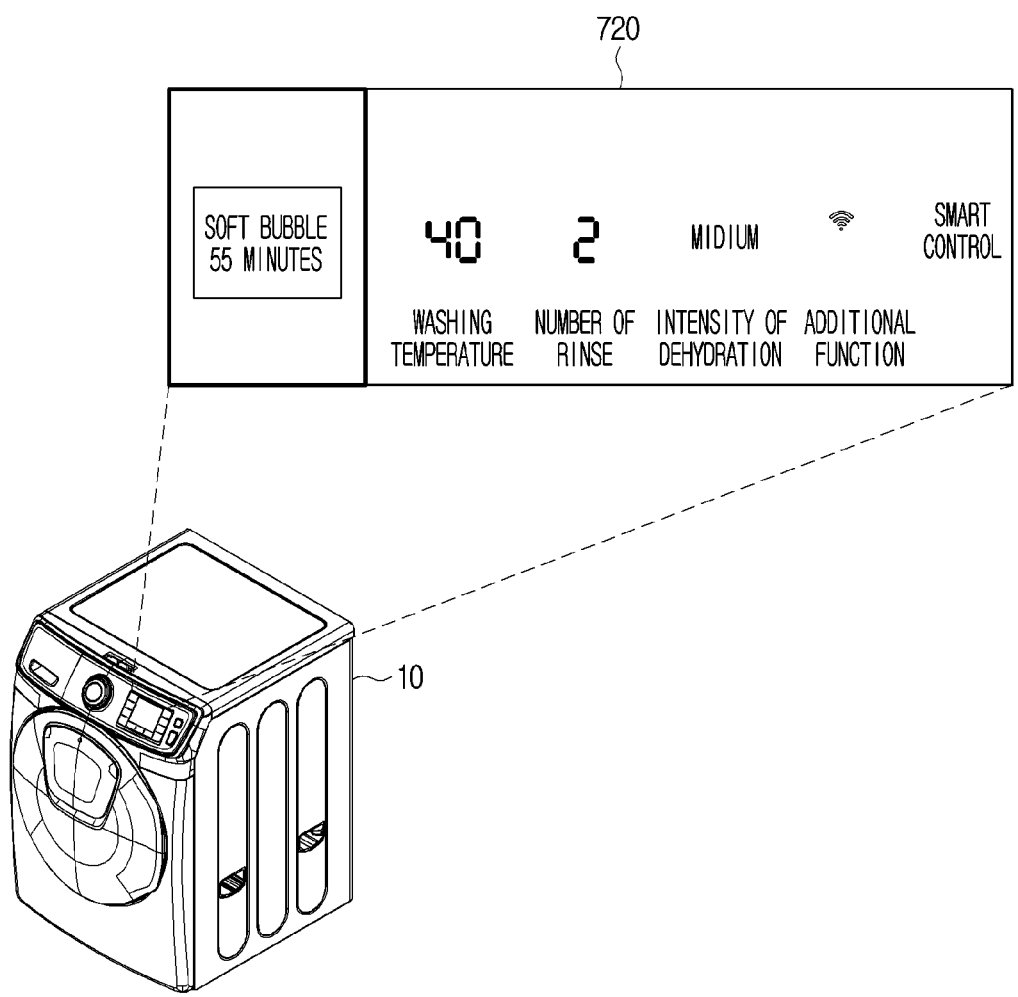
Figure 7C:
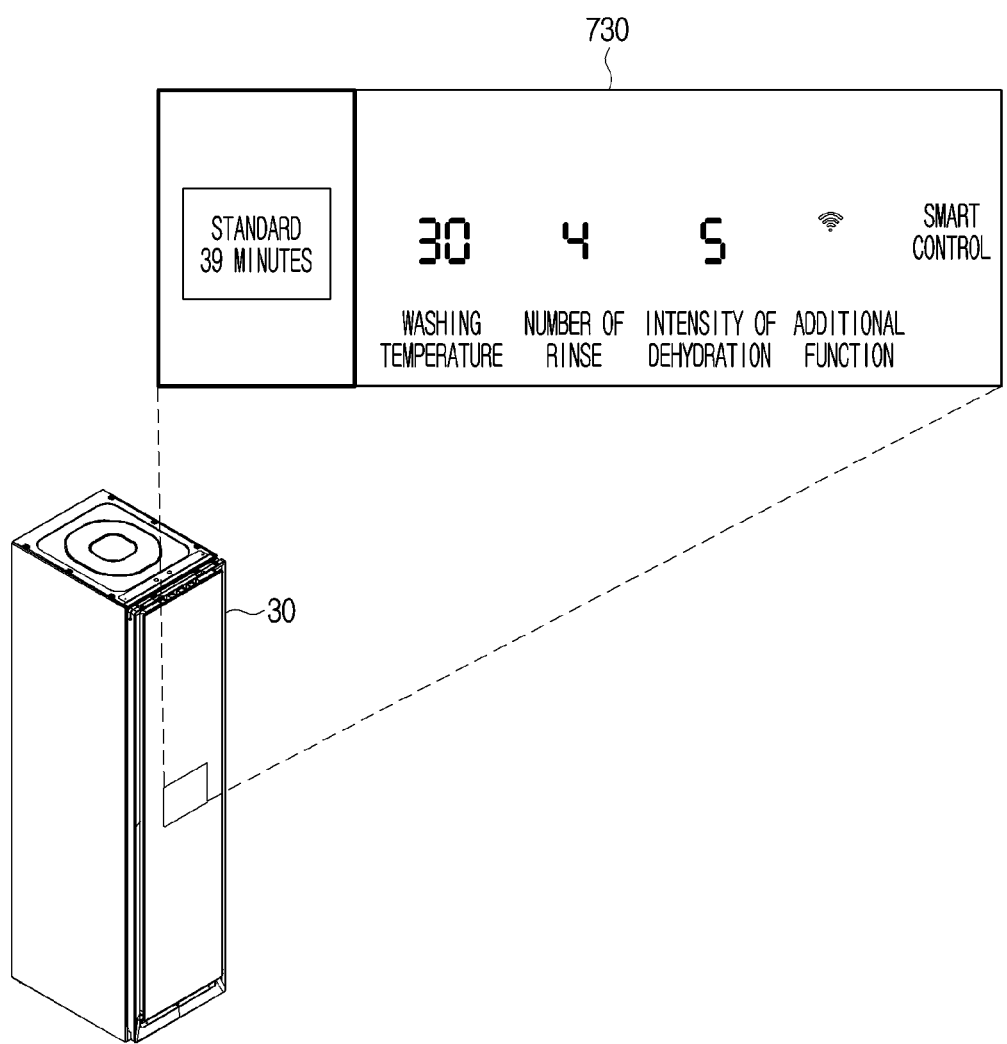

FIGS. 7A, 7B, and 7C are views illustrating a method of controlling each of clothing devices according to personalized care, according to various embodiments of the disclosure.

According to an embodiment, when recommended customized care information is selected on the UI screen, the processor 130 may transmit control information (or control signals) for controlling a plurality of related clothing care devices to the server 200 based on the selected customized care information. In that configuration, the server 200 may control the plurality of clothing care devices based on the received control information.

Referring to FIGS. 7A to 7C, according to an example, when the customized care information includes removing dust of a dyer, a soft bubble course of a washing machine, and a standard course of a clothing purifier, that is, an air dresser, the server 200 may transmit a control signal for operating each clothing care device as a corresponding course to each clothing care device. In that configuration, each clothing care device may be set to a corresponding course and operated. FIGS. 7A to 7C illustrate a state in which control information set in each of the dryer, washing machine, and air dresser is set through UI screens 710, 720, and 730 provided in each device. In that configuration, since the user only needs to operate each of the clothing care devices that are automatically set as described above, and separate settings may not be needed, thereby improving the user's convenience.

Figure 8A:
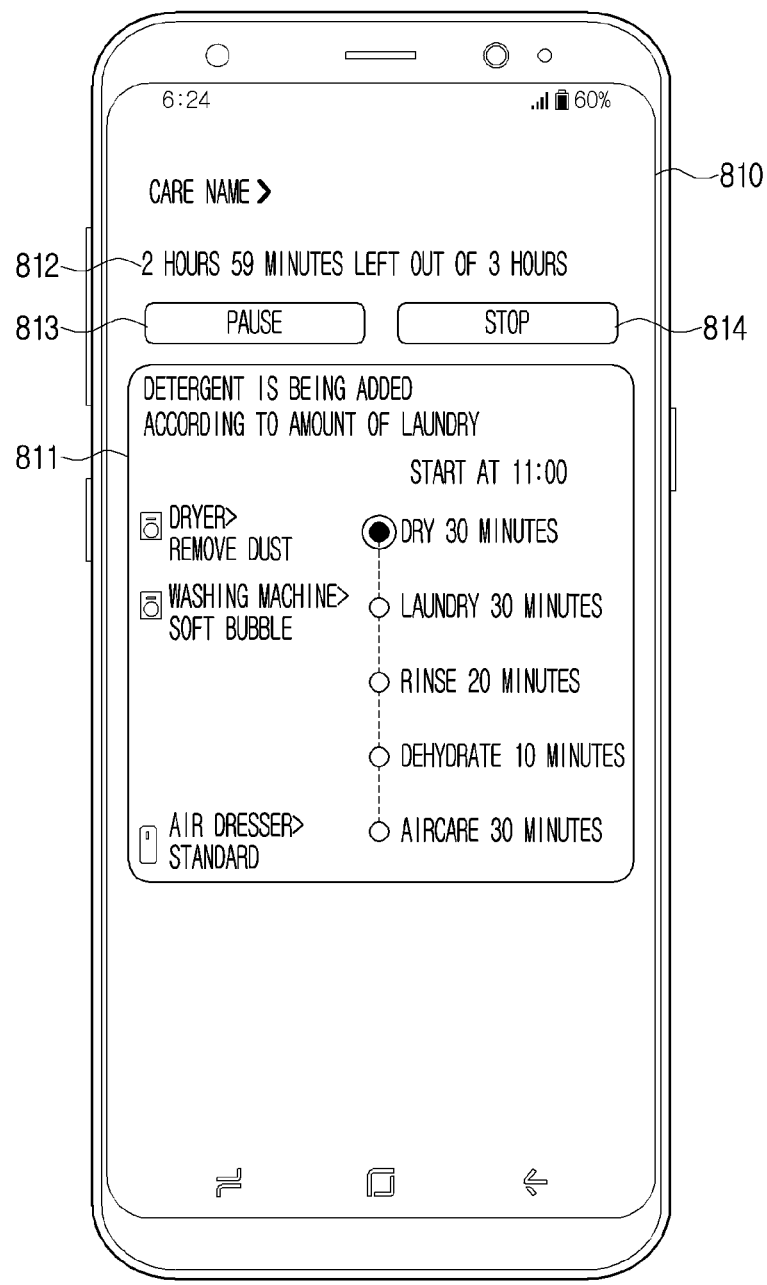
FIGS. 8A, 8B, and 8C are views illustrating a UI screen for providing progress information of customized care according to various embodiments of the disclosure.
Figure 8B:
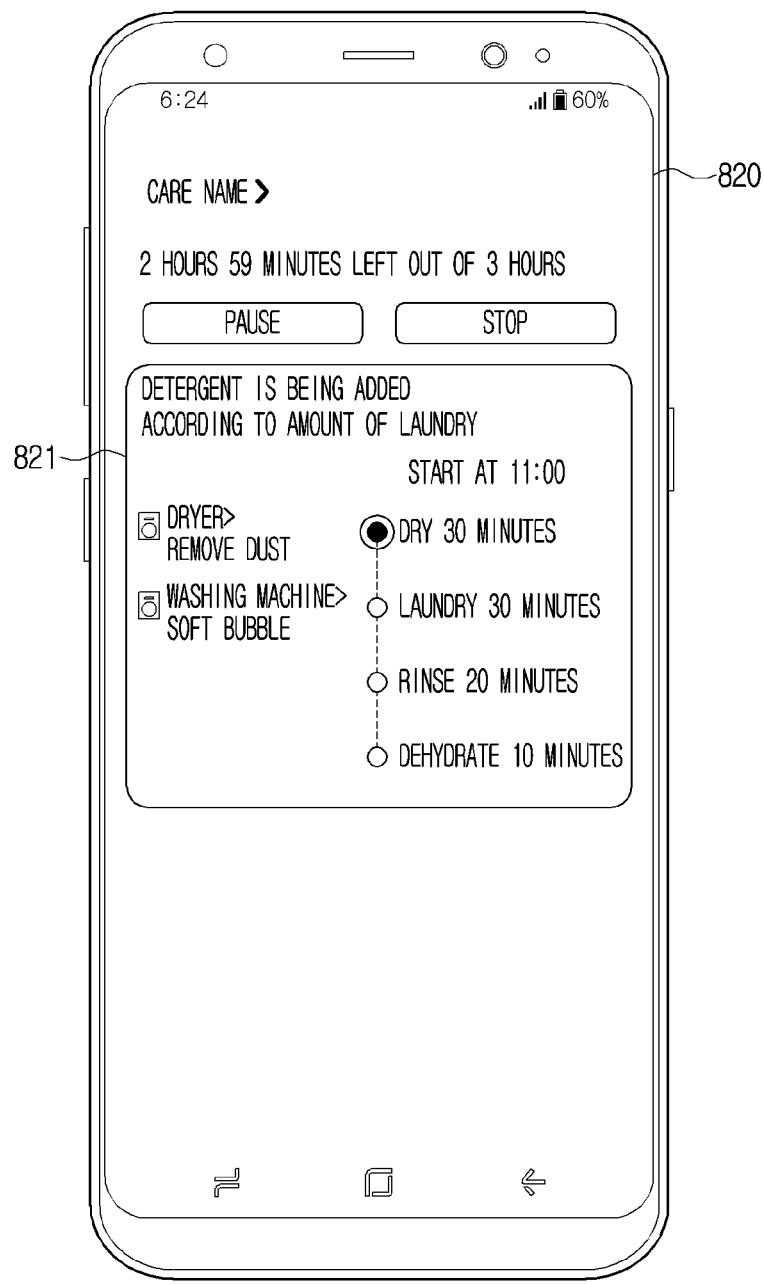
Figure 8C:
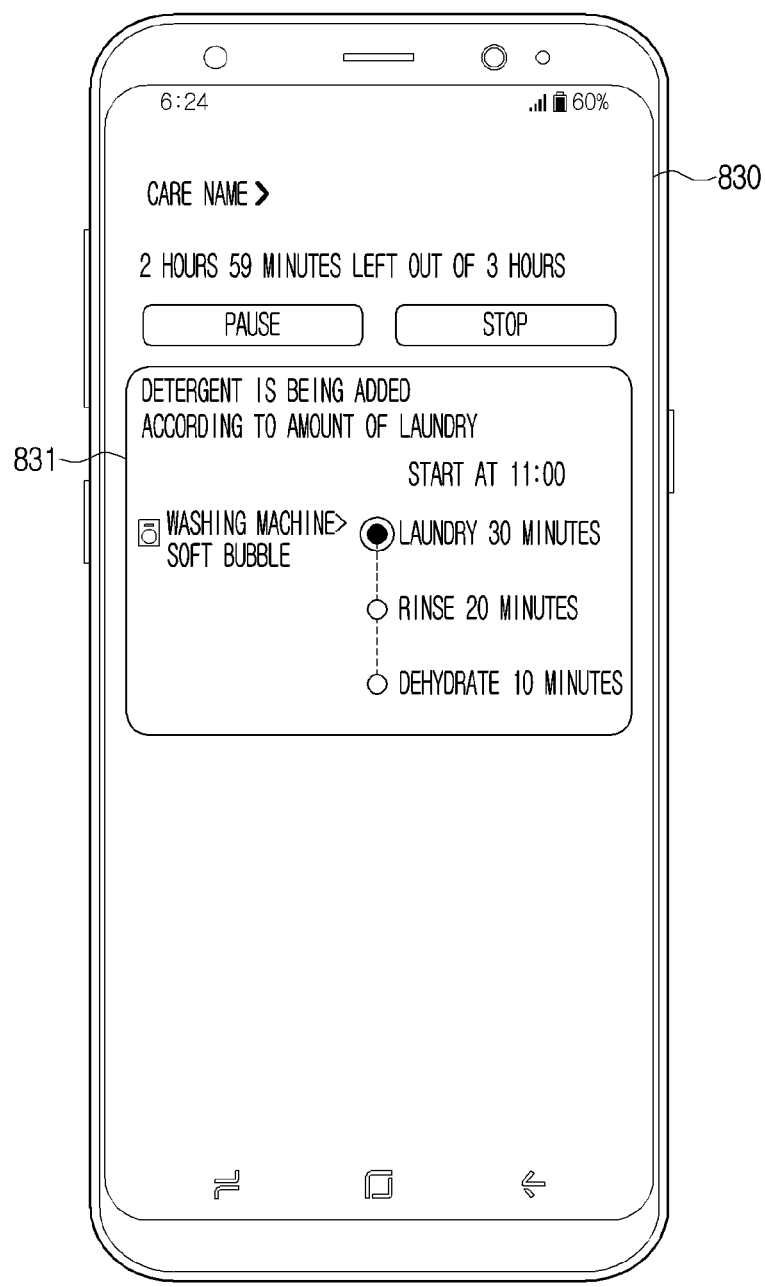

FIGS. 8A, 8B, and 8C are views illustrating a UI screen for providing progress information of customized care according to various embodiments of the disclosure.

According to an embodiment, when the customized care function is started, the processor 130 may provide a UI including information on a care progress of the customized care function. In that configuration, the information on the care progress may include at least one of status information of a currently operating care device, information on a currently waiting care device, and information on the remaining care time.

Referring to FIG. 8A, a UI screen 810 may display status information of a currently operating care device and information on a care device currently waiting 811, information on the remaining care time 812, a pause button 813 and a stop button 814. The currently operating care device may be displayed through a specific indicator (e.g., display by highlighting).

Referring to FIGS. 8B and 8C, UI screens 820 and 830 may also display status information of a currently operating care device and information 821 and 831 on a care device currently waiting.

FIGS. 9A, 9B, 9C, 9D, and 9E are views illustrating a customized care function according to interworking with other applications according to various embodiments of the disclosure.

According to an embodiment, user context information used to recommend customized care information may be received from the other application.

Figure 9A:
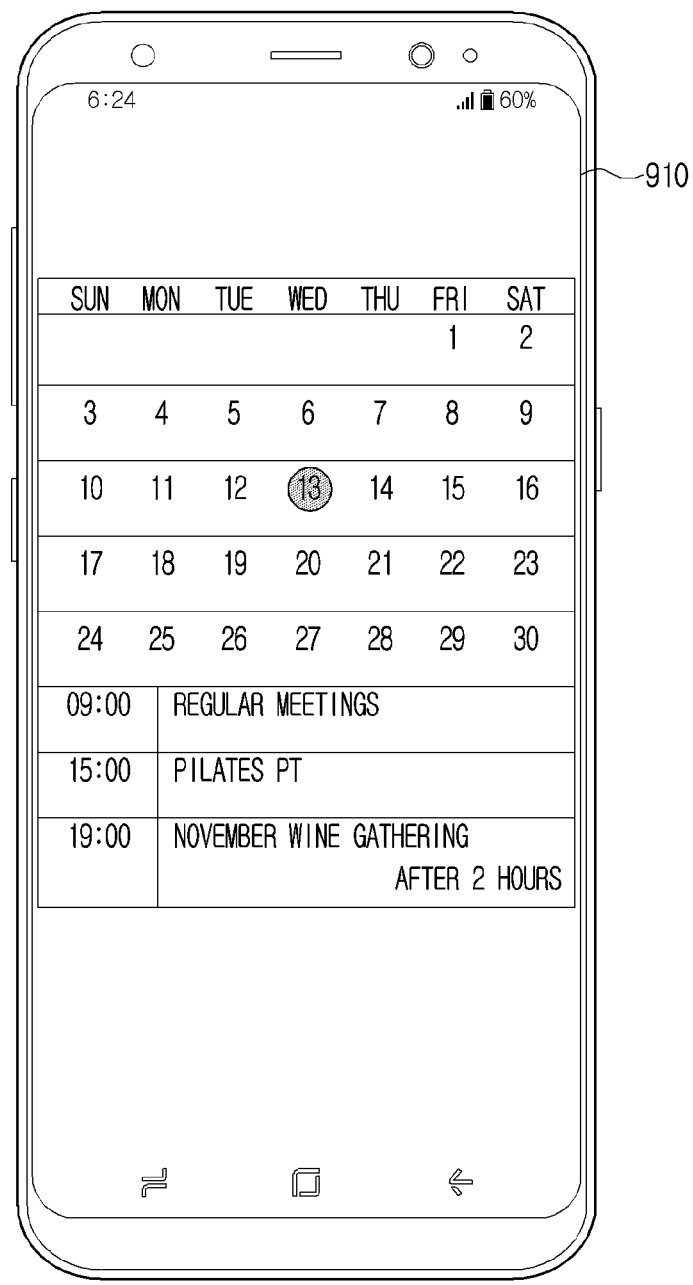
FIGS. 9A, 9B, 9C, 9D, and 9E are views illustrating a customized care function according to interworking with other applications according to various embodiments of the disclosure.

Referring to FIG. 9A, when the user's schedule information set on a calendar application 910 is received.

Figure 9B:

Referring to FIG. 9B, the processor 130 may provide a UI screen 920 including user's customized care information 921 based on the corresponding schedule information. The UI screen 920 may include not only the user's customized care information 921, but also user schedule information 922 used to recommend the corresponding customized care information.

Referring to FIG. 9B, when an end time of the customized care is set, the processor 130 may recommend a course available in each clothing care device according to the corresponding end time. In that configuration, the processor 130 may recommend integrated customized care by considering not only a running time of each course, but also a degree of relevance and synergy between courses to be performed by each clothing care device.

Figure 9C:
Figure 9D:

Referring to FIGS. 9C and 9D, meanwhile, when the user's customized care information 921 is selected by the user, UI screens 930 and 940 including progress information 931 and 941 of the customized care may be sequentially provided.

Figure 9E:
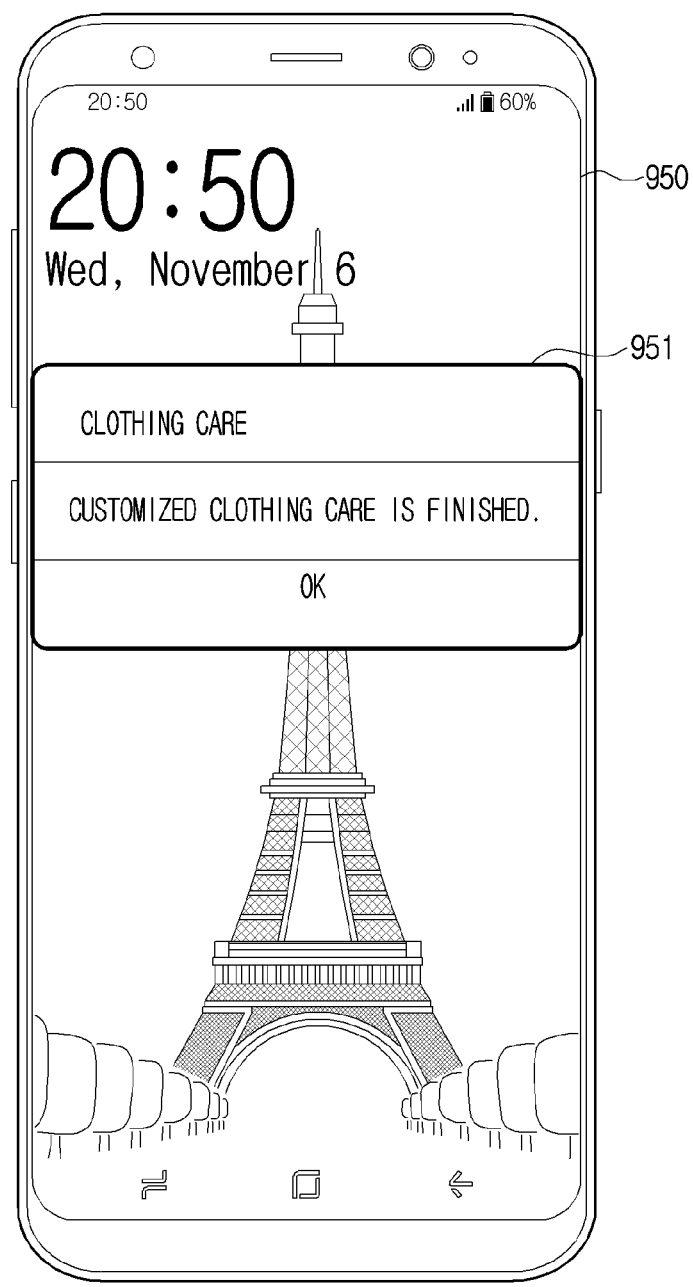

Referring to FIG. 9E, when the customization care is finished, a UI screen 950 notifying that the customized care has been finished 951 may be provided.

Figure 10A:
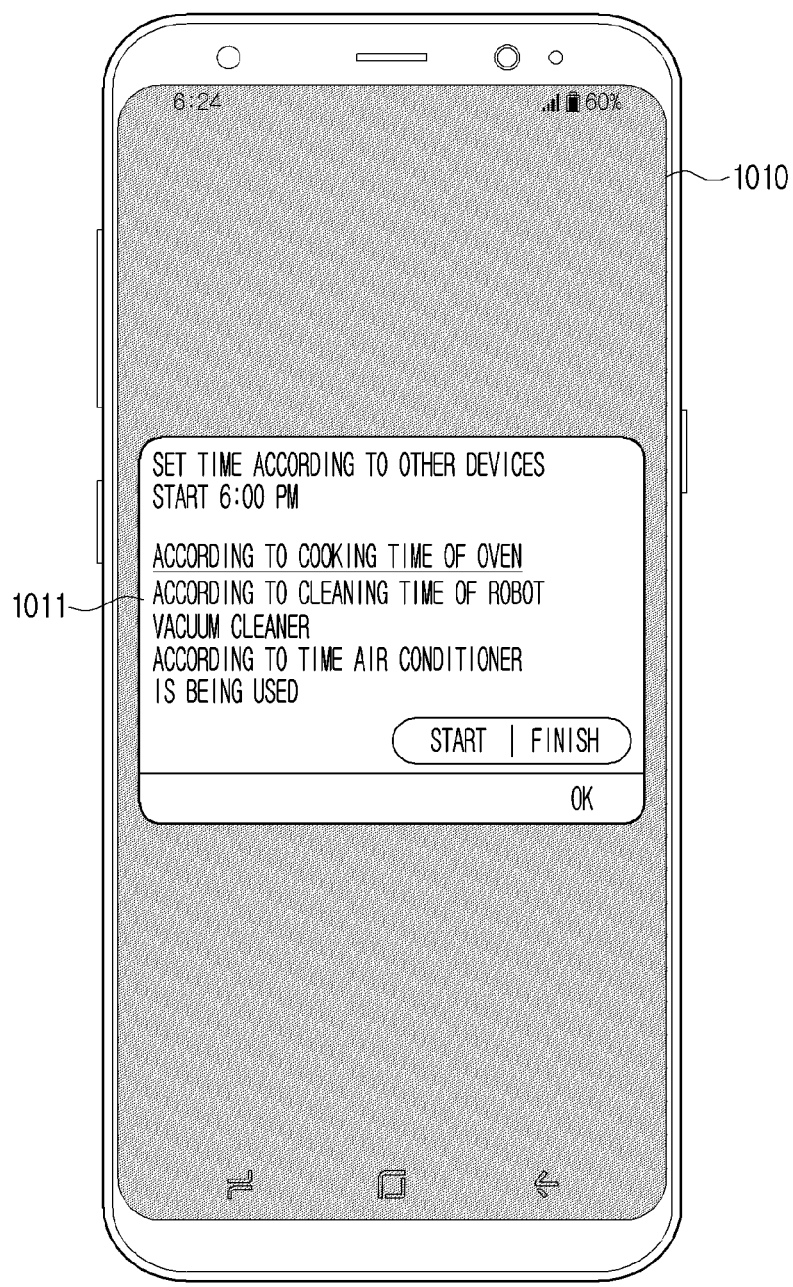
FIGS. 10A and 10B are views illustrating a customized care function according to interworking with other devices according to various embodiments of the disclosure.
Figure 10B:
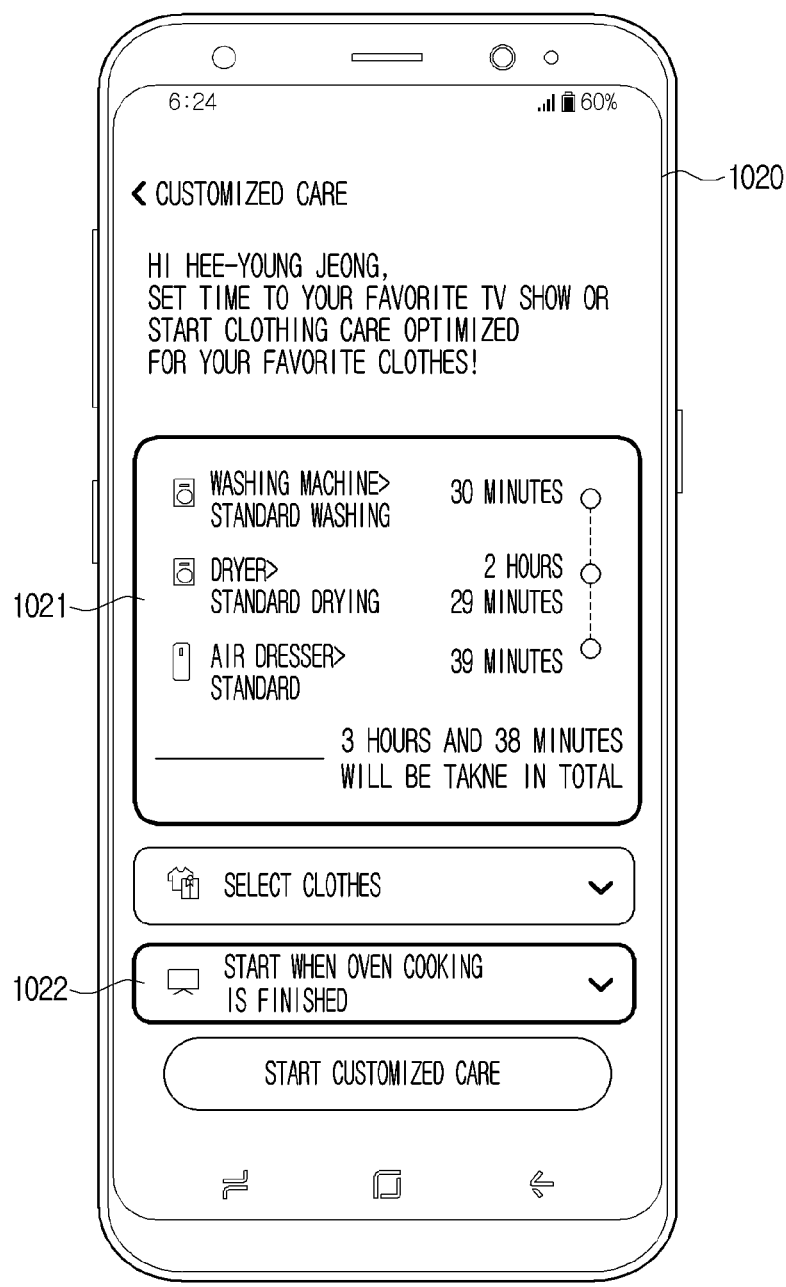

FIGS. 10A and 10B are views illustrating a customized care function according to interworking with other devices according to various embodiments of the disclosure.

According to an embodiment, the user context information used to recommend the customized care information may be status information of the other device or may be received from the other device.

Referring to FIG. 10A, when a specific status information, for example, an item "according to oven cooking time" is selected on a UI screen 1010 including status information 1011 of the other device.

Referring to FIG. 10B, the processor 130 may receive information about the oven cooking end time from the oven and provide a UI screen 1020 including user customized care information 1021 based on the received information. The corresponding UI screen 1020 may include not only the user customized care information 1021, but also status information 1022 of the other device used to recommend the corresponding customized care information. Although not shown in the drawings, UI screens indicating progress information of customized care as shown in FIGS. 9C, 9D and 9E may be sequentially provided.

Figure 11A:
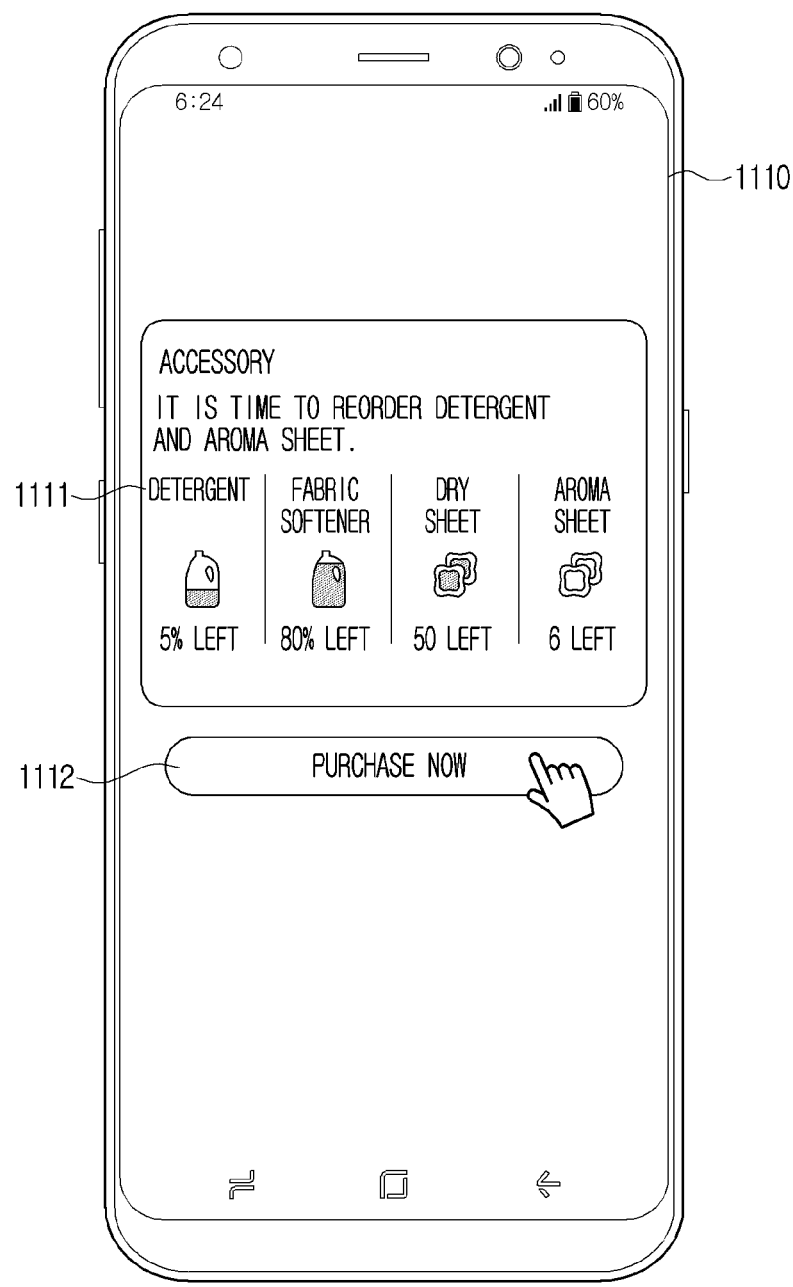
FIGS. 11A and 11B are views illustrating a UI screen for providing remaining status information of an accessory according to various embodiments of the disclosure.
Figure 11B:
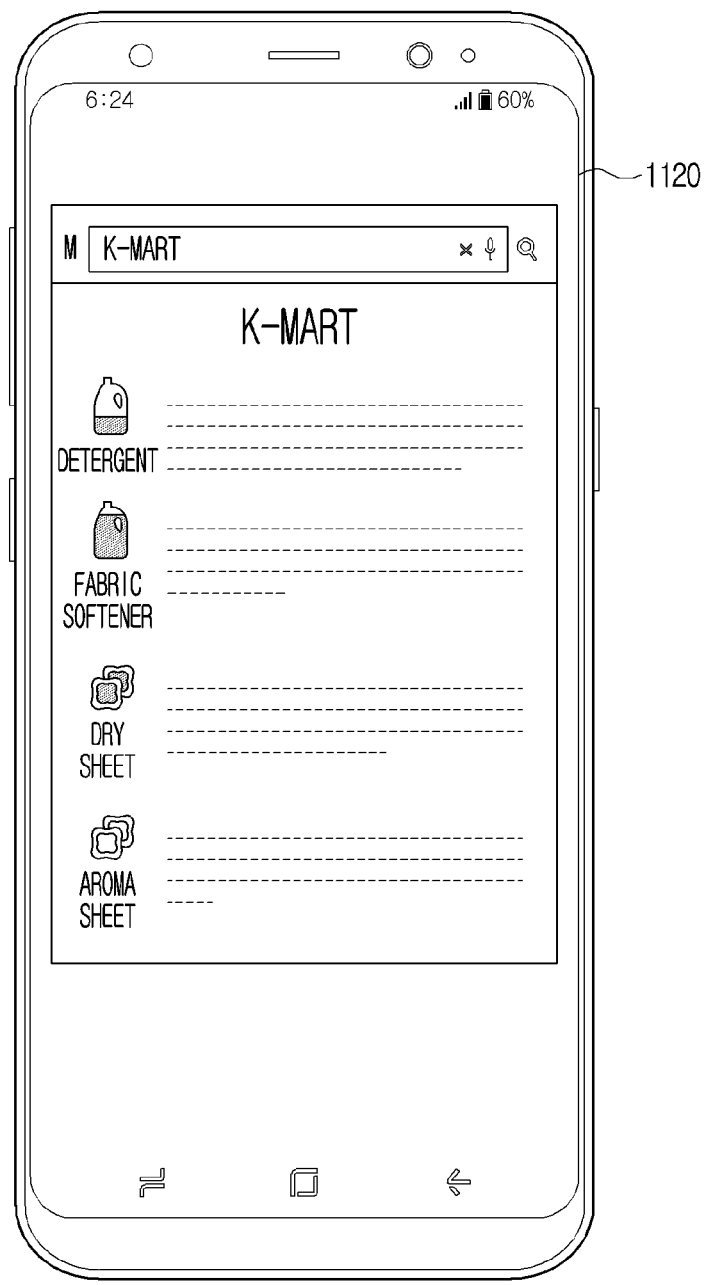

FIGS. 11A and 11B are views illustrating a UI screen for providing remaining status information of an accessory according to various embodiments of the disclosure.

According to an embodiment, the processor 130 may provide a UI screen displaying information related to accessory information of a plurality of clothing care devices at once.

Referring to FIGS. 11A and 11B, the processor 130 may provide a UI screen 1110 showing remaining status information 1111 of accessories related to a plurality of clothing care devices (e.g., washing machines and dryers) at once. For example, the processor 130 may provide a corresponding UI screen 1110 when a remaining amount of at least some of the plurality of accessories is less than or equal to a critical value. However, although not shown in the drawings, the UI screen 1110 may include guide information on a critical value used to guide accessory purchase. According to an example, the processor 130 may provide a UI screen including the remaining amount based on the number of care received from the clothing care device, the amount of accessories used during the operation, and the current amount of accessories.

Meanwhile, the UI screen may include a button 1112 that can be connected to a website where accessories can be purchased, that is, link information of the website. When the user selects the corresponding button 1112, as shown in FIG. 11B, the user may be connected to a corresponding site 1120. In addition, the processor 130 may update the remaining accessory amount based on the accessory purchase information received from a detergent purchase site and provide a UI screen providing information on the updated final accessory amount. The accessory purchase information may include information on an accessory purchase date, a purchased accessory amount, a purchased accessory type, or the like.

FIGS. 12A, 12B, 12C, and 12D are views illustrating a method of providing notification information according to various embodiments of the disclosure.

According to an embodiment, the processor 130 may provide a corresponding notification in a form of a pop-up notification as shown in FIGS. 12A to 12D when user intervention is required during customized care.

Figure 12A:
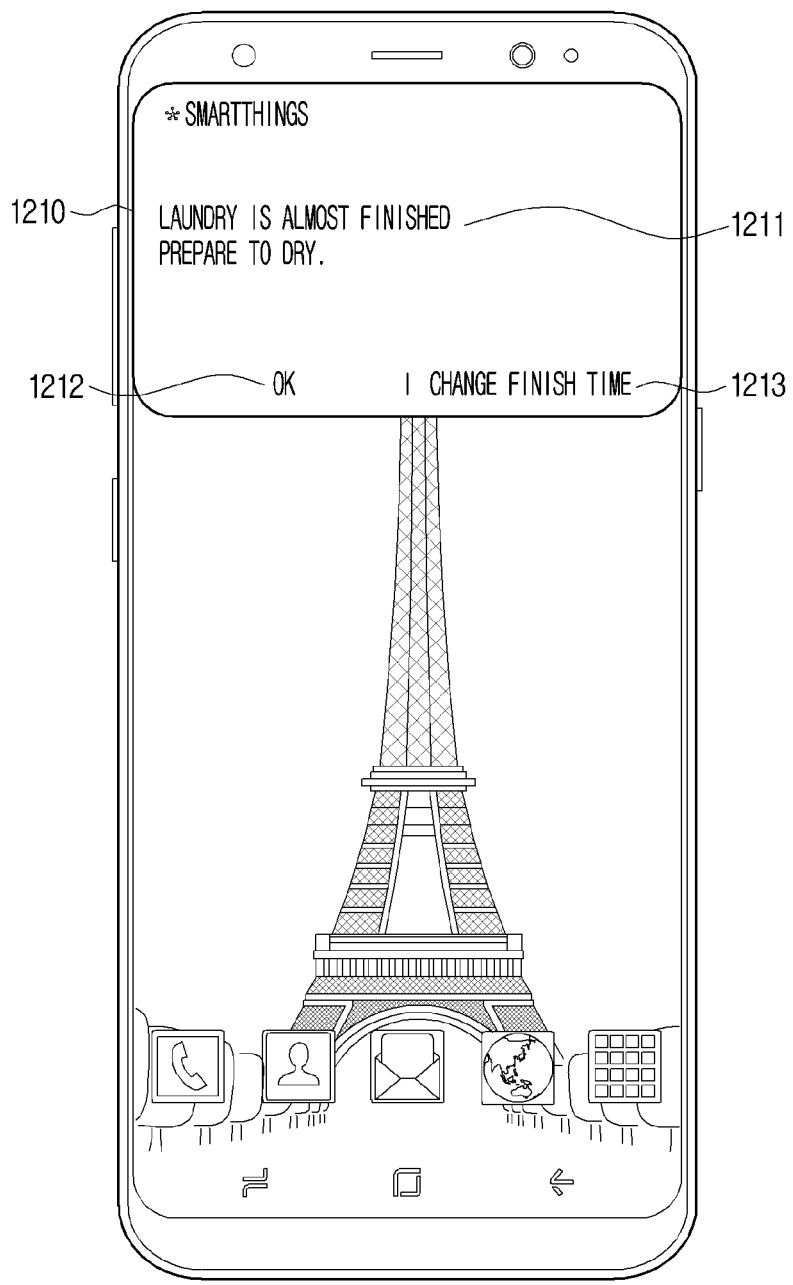
FIGS. 12A, 12B, 12C, and 12D are views illustrating a method of providing notification information according to various embodiments of the disclosure.

Referring to FIG. 12A, when the customized care is in a case in which a drying operation of a dryer is performed after a washing operation of a washing machine is performed, the processor 130 may provide a UI screen 1210 notifying that washing has been almost finished before a critical time (e.g., 3 minutes) for the washing operation to be finished. The corresponding UI screen 1210 may include corresponding guide information 1211 and an item 1212 for closing the corresponding UI screen 1210 and an item 1213 for changing the end time.

Figure 12B:
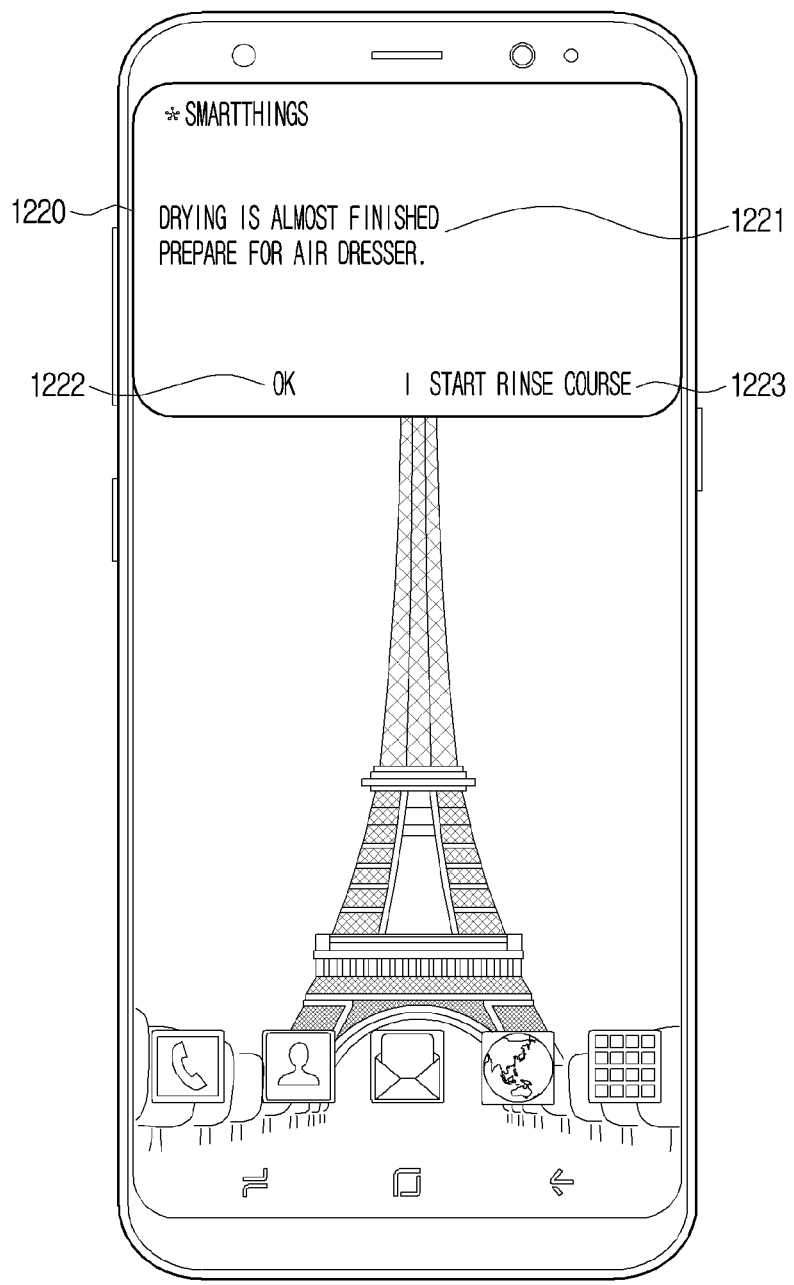

Referring to FIG. 12B, when the customized care is in a case in which a cleaning operation of an air dresser is performed after a drying operation of a dryer is performed, the processor 130 may provide a UI screen 1220 notifying that drying has been almost finished before a critical time (e.g., 3 minutes) for the drying operation to be finished. The corresponding UI screen 1220 may include corresponding guide information 1221 and an item 1222 for closing the corresponding UI screen 1220 and an item 1223 for changing the end time.

Figure 12C:
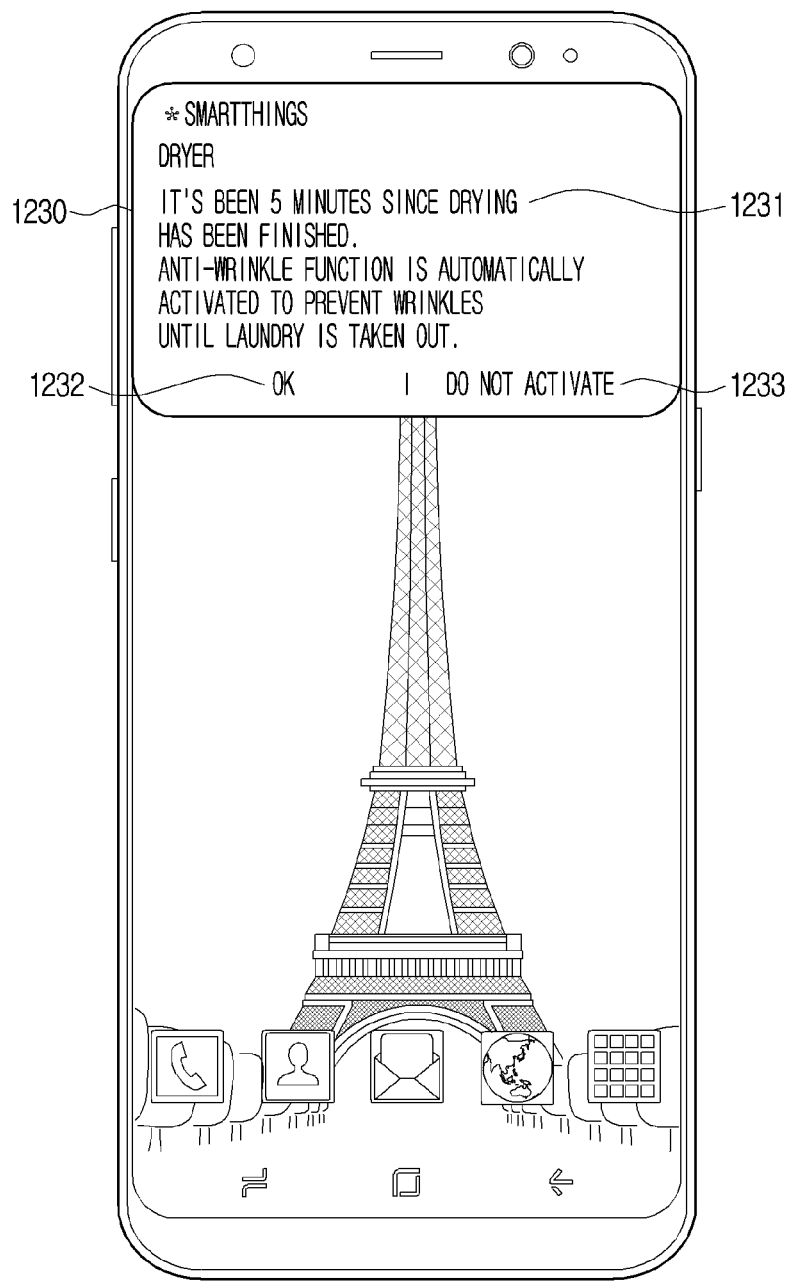

Referring to FIG. 12C, during the customized care, when the user does not collect laundry for more than a critical time (e.g., 5 minutes) after the drying operation of the dryer is completed, the processor may provide a UI screen 1230 recommending to perform an additional operation in order to prevent wrinkles in laundry. The corresponding UI screen 1230 may include information 1231 notifying that the additional operation is automatically performed, an item 1232 for closing the UI screen 1230, and an item for receiving a user command not to perform an additional operation 1233. When the item 1232 for closing the UI screen 1230 is selected by the user, the dryer may automatically tumble until the door is opened to prevent wrinkles under the control of an electronic apparatus 100.

Figure 12D:
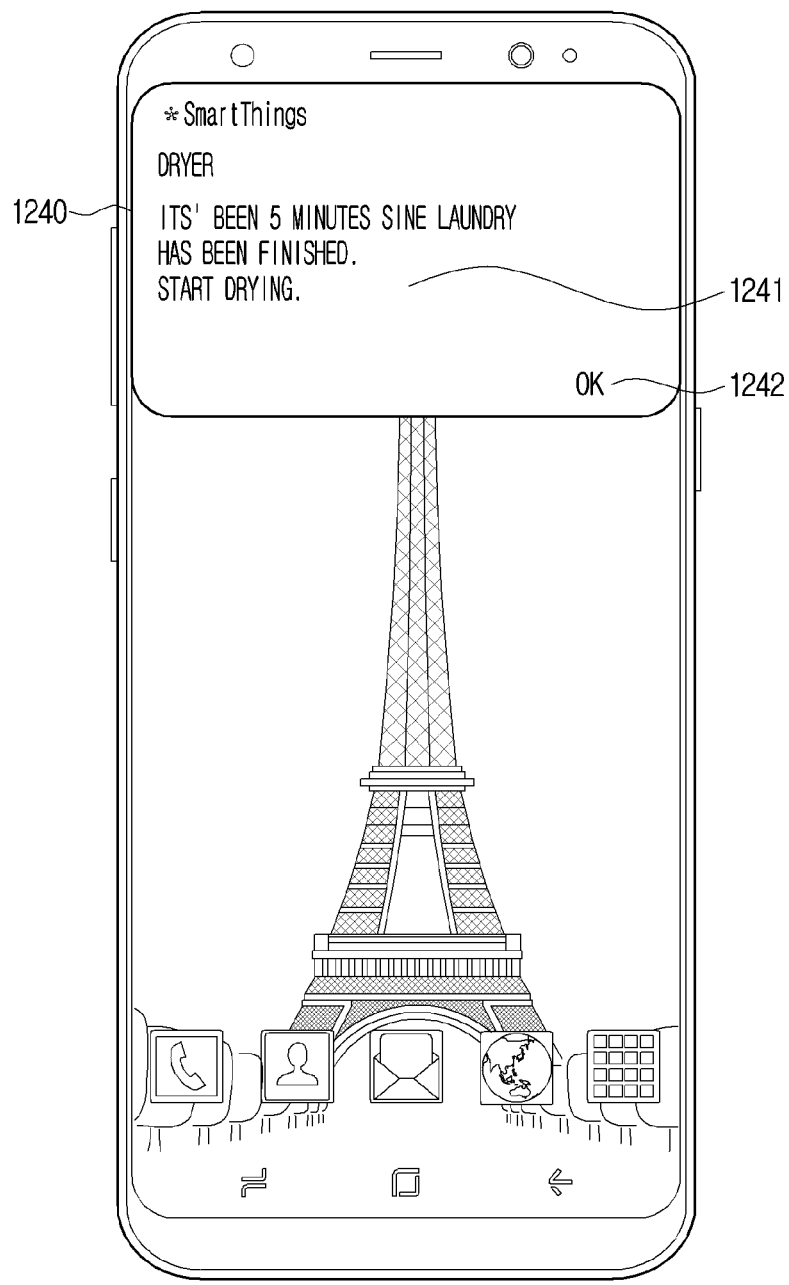

Referring to FIG. 12D, when laundry is not collected even after the washing operation of the washing machine is finished during customized care (e.g., drying operation after washing operation), the processor 130 may provide a UI screen 1240 for guiding the next operation while periodically providing a corresponding notification. The UI screen 1240 may include information 1241 notifying that the time passed after the washing operation is finished and that the next operation is a drying operation, and an item 1242 for closing the UI screen 1240. In that configuration, the processor 130 may provide a corresponding notification periodically (e.g., every 3 minutes).

Figure 13:
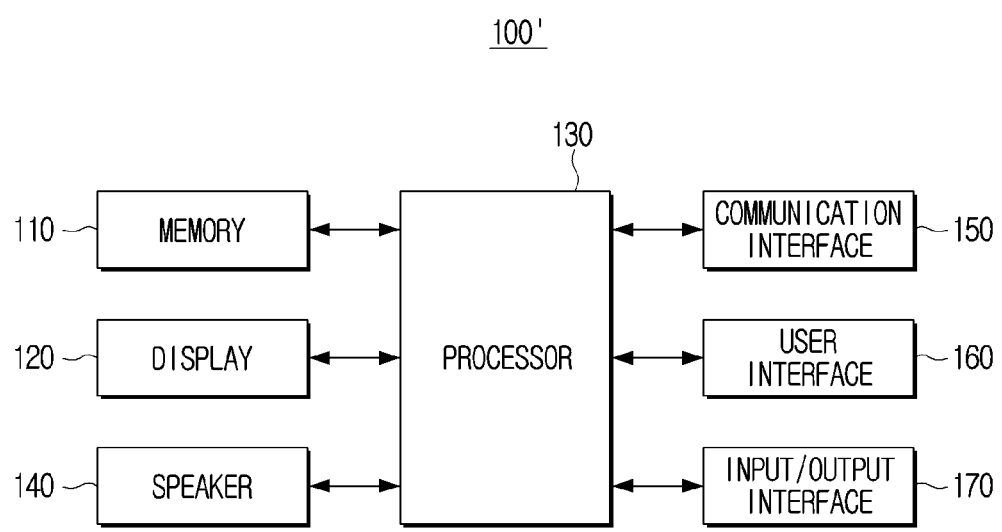
FIG. 13 is a view illustrating an implementation example of an electronic apparatus according to an embodiment of the disclosure.

FIG. 13 is a view illustrating an implementation example of an electronic apparatus according to an embodiment of the disclosure.

Referring to FIG. 13, the electronic apparatus 100' includes a memory 110, a display 120, a processor 130, a speaker 140, a communication interface 150, a user interface 160, an input/output interface 170, and a location interface (not shown). Detailed descriptions of constitutional elements illustrated in FIGS. 3A and 3B that are redundant with constitutional elements in FIG. 2 are omitted.

The memory 110 stores various modules for driving the electronic apparatus 100. For example, the memory 110 may store software including a base module, a sensing module, a communication module, a presentation module, a web browser module, and a service module. In that configuration, the base module is a basic module that processes signals transmitted from each hardware included in the electronic apparatus 100 and transmits the signals to a higher layer module. The sensing module is a module for collecting information from various sensors and analyzing and managing the collected information, and may include a face recognition module, a voice recognition module, a motion recognition module, an NFC recognition module, or the like. The presentation module is a module for configuring a display screen, and may include a multimedia module for playing and outputting multimedia content, and a UI rendering module for performing UI and graphic processing. The communication module is a module for performing communication with the outside. The web browser module refers to a module that accesses a web server by performing web browsing. The service module is a module including various applications for providing various services.

Meanwhile, the processor 130 may perform a graphic processing function (a video processing function). For example, the processor 130 may generate a screen including various objects such as icons, images, texts, or the like by using a calculator (not shown) and a rendering unit (not shown). The calculator (not shown) may calculate attribute values such as coordinate values, shape, size, color, or the like of each object to be displayed according to a layout of a screen based on the received control command. In addition, the rendering unit (not shown) may generate screens of various layouts including objects based on the attribute values calculated by the calculator (not shown).

Meanwhile, the processor 130 may process audio data. Specifically, the processor 130 may perform various processes such as decoding, amplification, noise filtering, or the like on audio data.

The speaker 140 may be a component that outputs various types of audio data processed by the input/output interface 170 as well as various notification sounds, voice messages, or the like. The processor 130 may control the speaker 140 to output information corresponding to a UI screen or various notifications in a form of audio according to various embodiments of the disclosure.

The communication interface 150 may communicate with a network device (not shown).

According to an embodiment, the communication interface 150 may include a wireless communication module that communicates with the AP device (FIG. 1). For example, the communication interface 150 may include a wireless communication module, for example, a Wi-Fi module. In other words, a communication network between the AP device 300 and the electronic apparatus 100 may be a Wi-Fi network, but is not limited thereto. The Wi-Fi module may perform communication according to at least one standard version of 802.11ac among 802.11a, 802.11b, 802.11g, and 802.11n, but is not limited thereto and may include a new version developed later.

However, the disclosure is not limited thereto, and in addition to the communication methods described above, the communication interface 150 may perform communication according to various wireless communication standards such as ZigBee, 3rd generation (3G), 3rd generation partnership project (3GPP), long term evolution (LTE), LTE Advanced (LTE-A), 4th generation (4G), 5th generation (5G), infrared Data Association (IrDA), or the like.

The user interface 160 may be implemented as a button, a touch pad, a mouse, a keyboard, or the like, or may be implemented as a touch screen capable of performing the above-described display function and manipulation input function. The button may include various types of buttons, such as a mechanical button, a touch pad, a wheel, etc., which are formed on the front, side, or rear of the exterior of a main body.

The Input/output interface 170 may be an interface one of High Definition Multimedia Interface (HDMI), Mobile High-Definition Link (MHL), Universal Serial Bus (USB), Display Port (DP), Thunderbolt, Video Graphics Array (VGA) port, RGB port, a D-subminiature (D-SUB), and a digital visual interface (DVI). The input/output interface 170 may input/output at least one of audio and video signals.

A location sensor may sense a location of the electronic apparatus 100. The location sensor may be implemented as a global positioning system (GPS) receiver, but is not limited as long as location information of the electronic apparatus 100 can be acquired Meanwhile, the electronic apparatus 100' may further include a microphone (not shown). A microphone is a component for receiving the user's voice or other sound and converting it into audio data. For example, a user command input on the UI screen according to various embodiments of the disclosure may be input in a form of a voice command.

Figure 14:
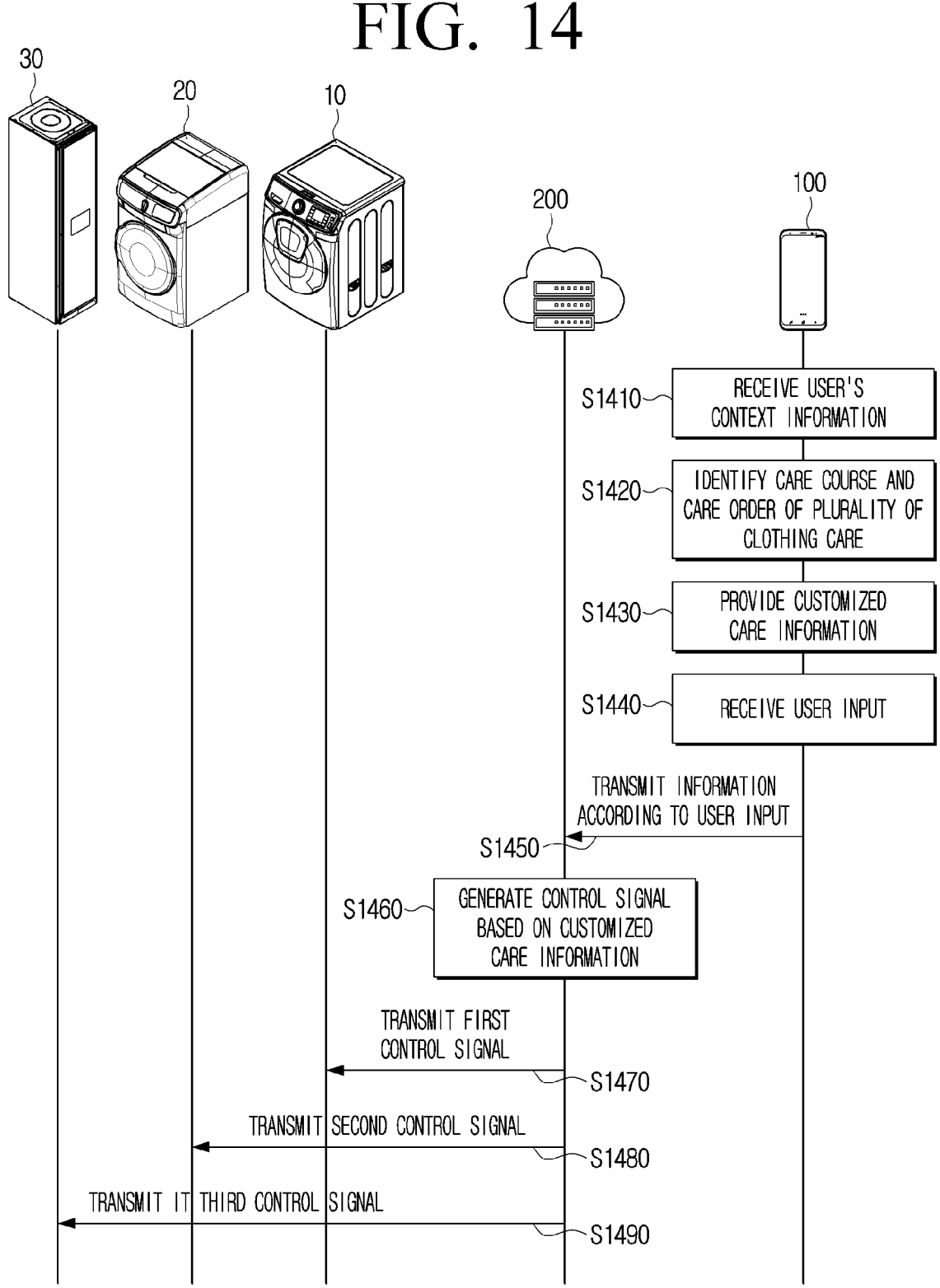
FIG. 14 is a sequence diagram illustrating an operation of an electronic system according to an embodiment of the disclosure.

FIG. 14 is a sequence diagram illustrating an operation of an electronic system according to an embodiment of the disclosure.

Referring to FIG. 14, when the user's context information is received at operation S1410, the electronic apparatus 100 may identify a care course and a care order of a plurality of clothing care devices based on the user's context information at operation S1420. The electronic apparatus 100 may provide customized care information based on the care course and care order of the plurality of identified clothing care devices at operation S1430.

When a user input for selecting customized care is received at operation S1440, the electronic apparatus 100 may transmit information corresponding to the customized care to the server 200 at operation S1450.

The server 200 may generate a control signal for controlling a plurality of clothing care devices at operation S1460, respectively, for example, the washing machine 10, the dryer 20, and the clothing purifier 30 based on the customized care information received from the electronic apparatus 100. The customized care information may include course information of the corresponding clothing care devices. For example, the server 200 may transmit a first control signal, a second control signal, and a third control signal to the washing machine 10, the dryer 20 and the clothing purifier 30, respectively at operations S1470, S1480, and S1490.

In that configuration, each of the washing machine 10, the dryer 20, and the clothing purifier 30 may set operation care, for example, a course based on the received control signal.

Figure 15:
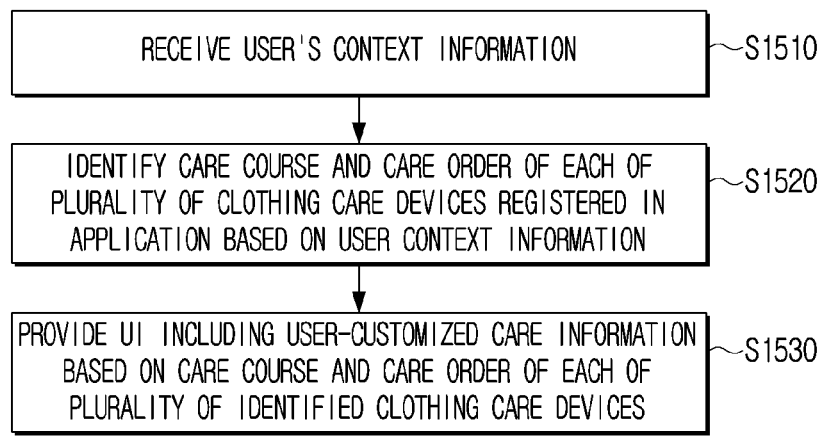
FIG. 15 is a flowchart illustrating a method of controlling an electronic apparatus according to an embodiment of the disclosure.

FIG. 15 is a flowchart illustrating a method of controlling an electronic apparatus according to an embodiment of the disclosure.

Referring to FIG. 15, according to a control method of the electronic apparatus for controlling the plurality of clothing care devices by executing an application, when the user's context information is received at operation S1510, the electronic apparatus 100 may identify the care course and care order of each of the plurality of clothing care devices registered in the application based on the received user context information at operation S1520. The user's context information may include at least one of the user's lifestyle information, care available time information, clothing attribute information, and clothing quantity information. The user's context information may be received by a user input on an execution screen of the application, or may be received from the other application. Meanwhile, the plurality of clothing care devices may include at least two or more of a washing machine, a dryer, and a clothing purifier.

The electronic apparatus 100 may provide a UI including user-customized care information based on the care course and care order of each of the plurality of identified clothing care devices at operation 51530.

In addition, at operation S1520, at least two clothing care devices among the plurality of clothing care devices may be identified based on the context information of the user, and care course information of each of the selected clothing care devices may be identified.

In addition, at operation S1520, the care order of the plurality of clothing care devices based on the user's first context information and the type information of the plurality of clothing care devices may be identified, the care course of a first clothing care device among the plurality of clothing care devices based on the user's second context information may be identified, and the care course of a second clothing care device among the plurality of clothing care devices based on the user context information and the care course information of the first clothing care device may be identified. The care of the first clothing care device may be performed before the care of the second clothing care device.

Alternatively, at operation S1520, the care course of the plurality of clothing care devices based on the user's third context information and the type information of the plurality of clothing care devices may be identified, and the care order of the plurality of clothing devices based on the user's fourth context information may be identified.

In that configuration, the user's customized care information may include the care course information, care time information, and care progress of each of the plurality of clothing care devices. In addition, the information on the care progress may include at least one of status information of a currently operating care device, and information on a currently waiting care device.

In addition, the control method of the electronic apparatus 100 may further include providing notification information as at least one of a GUI and a sound when a user's intervention is required while care is in progress according to the user's customized care information.

In addition, the control method of the electronic apparatus 100 may further include displaying a UI including purchase-related information including remaining status information of accessories associated with each of the plurality of clothing care devices and link information of a purchase site.

In addition, when some information among a plurality of care information included in the customized care information is modified by a user input, the control method of the electronic apparatus 100 may further include reflecting the modified information to provide customized care information thereafter.

According to various embodiments described above, a complex clothing care method tailored for the user's interests is integrally guided, thereby improving the user's convenience. In addition, since various guides related to the control of the clothing care device are provided, thereby improving user convenience.

The methods according to the above-described example embodiments may be realized as software or applications that may be installed in the existing electronic apparatus.

Further, the methods according to the above-described example embodiments may be realized by upgrading the software or hardware of the existing electronic apparatus.

In addition, various embodiments as described above may be performed through an embedded server provided in the electronic apparatus or at least one of a server outside the electronic apparatus.

According to an embodiment, the various embodiments described above may be implemented as software including instructions stored in a machine-readable storage media which is readable by a machine (e.g., a computer). The machine is an apparatus which is capable of calling a stored instruction from the storage medium and operating according to the called instruction, and may include an electronic apparatus according to the above-described example embodiments. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The term "non-transitory storage medium may refer to a tangible device and does not include a signal (e.g., electromagnetic wave), and the term does not distinguish between the case that the data is permanently stored in the storage medium and the case that the data is temporarily stored in the storage medium. For example, the "non-transitory storage medium" may include a buffer in which data is temporarily stored.

According to an embodiment, the method according to various embodiments disclosed in the disclosure may be provided as being included in a computer program product. The computer program product may be traded between a seller and a buyer. The computer program product may be distributed in the form of a device-readable storage medium (e.g., compact disc read only memory (CD-ROM)) or through application stores (e.g., Play Store™), or may be distributed (e.g., downloaded or uploaded) directly or online between two user devices (e.g., smartphones). In the case of online distribution, at least some of the computer program products (e.g. downloadable apps) may be temporarily stored on a storage medium readable by a device, such as a manufacturer's server, an application store's server, or a relay server, or may be temporarily generated.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program module, or other component, according to various embodiments, may be sequential, parallel, or both, executed iteratively or heuristically, or at least some operations may be performed in a different order, omitted, or other operations may be added.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic apparatus comprising:
  memory storing one or more computer programs and an application;
  a display; and
  one or more processors communicatively coupled to the display and the memory,
  wherein the memory store one or more computer programs include computer-executable instructions that, when executed by the one or more processors individually or collectively, cause the electronic apparatus to:
    execute the application, based on context information of a user being received,
    identify a care course and a care order of each of a plurality of clothing care devices registered in the application based on the received user context information of the user, the care course and care order of each of the plurality of clothing care devices includes information on a start time based on a predicted arrival time of the user determined using a distance of a location of the electronic apparatus from a location of each of the each of the plurality of clothing care devices, and
    control the display to provide a user interface (UI) including customized care information of the user based on the care course and care order of each of the plurality of clothing care devices.

2. The electronic apparatus of claim 1,
  wherein the context information of the user is configured to include at least one of lifestyle information, care available time information, clothing attribute information, or clothing quantity information of the user, and
  wherein the plurality of clothing care devices are configured to include at least two of a washing machine, a dryer, or a clothing purifier.

3. The electronic apparatus of claim 1, wherein the one or more computer programs further include computer-executable instructions that, when executed by the one or more processors individually or collectively, cause the electronic apparatus to:
  identify at least two clothing care devices among the plurality of clothing care devices based on the context information of the user, and
  identify care course information of each of the identified at least two clothing care devices.

4. The electronic apparatus of claim 1,
  wherein the one or more computer programs further include computer-executable instructions that, when executed by the one or more processors individually or collectively, cause the electronic apparatus to:
    identify a care order of the plurality of clothing care devices based on first context information of the context information of the user and type information of the plurality of clothing care devices,
    identify a care course of a first clothing care device among the plurality of clothing care devices based on second context information of the context information of the user, and
    identify a care course of a second clothing care device among the plurality of clothing care devices based on the context information of the user and the care course of the first clothing care device, and
  wherein the care course of the first clothing care device is configured to be performed before the care course of the second clothing care device.

5. The electronic apparatus of claim 1, wherein the one or more computer programs further include computer-executable instructions that, when executed by the one or more processors individually or collectively, cause the electronic apparatus to:
- identify a care course of the plurality of clothing care devices based on third context information of the context information of the user and type information of the plurality of clothing care devices, and
- identify a care order of the plurality of clothing care devices based on fourth context information of the context information of the user.

6. The electronic apparatus of claim 1,
wherein the customized care information is further configured to include information on care course information of the user, care time information, and care progress information of each of the plurality of clothing care devices,
wherein the care progress information is configured to include status information of a currently operating care device and information on a care device currently on standby.

7. The electronic apparatus of claim 1, further comprising:
a speaker,
wherein the one or more computer programs further include computer-executable instructions that, when executed by the one or more processors individually or collectively, cause the electronic apparatus to control at least one of the display or the speaker to provide notification information when intervention by the user is required while care is in progress according to the customized care information of the user.

8. The electronic apparatus of claim 1, wherein the one or more computer programs further include computer-executable instructions that, when executed by the one or more processors individually or collectively, cause the electronic apparatus to control the display to display a further UI including remaining status information of an accessory with respect to each of the plurality of clothing care devices and purchase-related information including link information of a purchase site.

9. The electronic apparatus of claim 1, wherein the one or more computer programs further include computer-executable instructions that, when executed by the one or more processors individually or collectively, cause the electronic apparatus to, based on some of a plurality of care information included in the customized care information of the user being modified by a user input, reflect the modified information and provide modified customized care information of the user thereafter.

10. The electronic apparatus of claim 1, wherein the context information of the user is configured to be received by a user input on an execution screen of the application or received from another application.

11. A method performed by a user terminal for controlling a plurality of clothing care devices, the method comprising:
executing, by the user terminal, an application;
based on context information of a user being received, identifying, by the user terminal, a care course and a care order of each of a plurality of clothing care devices registered in the application based on the received context information of the user, the care course and care order of each of the plurality of clothing care devices includes information on a start time based on a predicted arrival time of the user determined using a distance of a location of the user terminal from a location of each of the each of the plurality of clothing care devices; and
providing, by the user terminal, a user interface (UI) including customized care information of the user based on the care course and care order of each of the plurality of clothing care devices.

12. The method of claim 11,
wherein the context information of the user is configured to include at least one of lifestyle information, care available time information, clothing attribute information, or clothing quantity information of the user, and
wherein the plurality of clothing care devices are configured to include at least two of a washing machine, a dryer, or a clothing purifier.

13. The method of claim 11, wherein the identifying of the care course and the care order of each of the plurality of clothing care devices includes:
identifying at least two clothing care devices among the plurality of clothing care devices based on the context information of the user; and
identifying care course information of each of the identified at least two clothing care devices.

14. The method of claim 11,
wherein the identifying of the care course and the care order of each of the plurality of clothing care devices includes:
identifying a care order of the plurality of clothing care devices based on first context information of the context information of the user and type information of the plurality of clothing care devices,
identifying a care course of a first clothing care device among the plurality of clothing care devices based on second context information of the context information of the user, and
identifying a care course of a second clothing care device among the plurality of clothing care devices based on the context information of the user and the care course of the first clothing care device, and
wherein the care course of the first clothing care device is configured to be performed before the care course of the second clothing care device.

15. The method of claim 11, wherein the identifying of the care course and the care order of each of the plurality of clothing care devices includes:
identifying a care course of the plurality of clothing care devices based on third context information of the context information of the user and type information of the plurality of clothing care devices; and
identifying a care order of the plurality of clothing care devices based on fourth context information of the context information of the user.

16. The method of claim 11,
wherein the customized care information of the user is further configured to include information on care course information, care time information, and care progress information of each of the plurality of clothing care devices, and
wherein the care progress information is configured to include status information of a currently operating care device and information on a care device currently on standby.

17. The method of claim 11, further comprising:
providing notification information when intervention by the user is required while care is in progress according to the customized care information of the user.

18. The method of claim 11, further comprising:
displaying a further UI including remaining status information of an accessory with respect to each of the plurality of clothing care devices and purchase-related information including link information of a purchase site.

19. The method of claim 11, further comprising:
based on some of a plurality of care information included in the customized care information of the user being modified by a user input, reflecting the modified information and providing modified customized care information of the user thereafter.

20. The method of claim 11, wherein the context information of the user is configured to be received by a user input on an execution screen of the application or received from another application.

\* \* \* \* \*